United States Patent
Sakawaki et al.

(10) Patent No.: US 7,867,638 B2
(45) Date of Patent: *Jan. 11, 2011

(54) MAGNETIC RECORDING MEDIUM, METHOD FOR PRODUCING THEREOF, AND MAGNETIC RECORDING AND REPRODUCING APPARATUS

(75) Inventors: Akira Sakawaki, Ichihara (JP); Kenji Shimizu, Ichihara (JP); Kazuo Kobayashi, Oyama (JP); Hiroshi Sakai, Ichihara (JP); Soichi Oikawa, Kawasaki (JP); Takeshi Iwasaki, Kawasaki (JP); Tomoyuki Maeda, Kawasaki (JP); Futoshi Nakamura, Kawasaki (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 12/274,879

(22) Filed: Nov. 20, 2008

(65) Prior Publication Data

US 2009/0141399 A1    Jun. 4, 2009

Related U.S. Application Data

(63) Continuation of application No. 10/552,445, filed as application No. PCT/JP2004/004994 on Apr. 7, 2004, now Pat. No. 7,470,474.

(60) Provisional application No. 60/462,298, filed on Apr. 14, 2003.

(30) Foreign Application Priority Data

Apr. 7, 2003    (JP)    ............................ 2003-103454

(51) Int. Cl.
*G11B 5/66* (2006.01)
*G11B 5/673* (2006.01)
*C23C 16/40* (2006.01)

(52) U.S. Cl. ............... 428/829; 428/836.2; 360/131; 427/127; 427/255.19; 427/255.29

(58) Field of Classification Search ............... None
See application file for complete search history.

(56) References Cited

U.S. PATENT DOCUMENTS 5,991,126 A    11/1999   Hayashi et al.

(Continued)

FOREIGN PATENT DOCUMENTS

JP    02-094109 A    4/1990

(Continued)

OTHER PUBLICATIONS

Liou et al., "Granular metal films as recording media," *Appl. Phys. Lett.* 52(6):512-514 (1988).

(Continued)

*Primary Examiner*—Kevin M Bernatz
(74) *Attorney, Agent, or Firm*—Sughrue Mion, PLLC

(57) ABSTRACT

A magnetic-recording medium which is provided on a nonmagnetic substrate with at least an orientation-controlling layer for controlling the orientation of a layer formed directly thereon, a perpendicularly magnetic layer having an easily magnetizing axis oriented mainly perpendicularly relative to the nonmagnetic substrate, and a protective layer. The perpendicularly magnetic layer includes two or more magnetic layers, at least one of the magnetic layers is a layer having Co as a main component and containing Pt as well and containing an oxide, and at least another of the magnetic layers is a layer having Co as a main component and containing Cr as well and containing no oxide.

12 Claims, 7 Drawing Sheets

U.S. PATENT DOCUMENTS

| | | |
|---|---|---|
| 6,468,670 B1 | 10/2002 | Ikeda et al. |
| 6,511,761 B1 | 1/2003 | Tanahashi et al. |
| 6,562,481 B1 | 5/2003 | Kaitsu et al. |
| 6,830,824 B2 | 12/2004 | Kikitsu et al. |
| 7,132,176 B2 * | 11/2006 | Iwasaki et al. ............... 428/829 |
| 7,132,177 B2 | 11/2006 | Mukai |
| 7,226,674 B2 | 6/2007 | Koda et al. |
| 7,311,983 B2 | 12/2007 | Watanabe et al. |
| 7,470,474 B2 * | 12/2008 | Sakawaki et al. ........... 428/829 |
| 2001/0051287 A1 | 12/2001 | Kikitsu et al. |
| 2003/0064249 A1 | 4/2003 | Iwazumi et al. |
| 2003/0134151 A1 | 7/2003 | Usuki et al. |
| 2005/0153169 A1 | 7/2005 | Watanabe et al. |

FOREIGN PATENT DOCUMENTS

| | | |
|---|---|---|
| JP | 08-279195 A | 10/1996 |
| JP | 2000-268340 A | 9/2000 |
| JP | 2000-276729 | 10/2000 |
| JP | 2001-184626 A | 7/2001 |
| JP | 2001-319314 A | 11/2001 |
| JP | 2002-025030 A | 1/2002 |
| JP | 2002-208127 A | 7/2002 |
| JP | 2003-168207 A | 6/2003 |
| WO | WO 03/009280 A1 | 1/2003 |

OTHER PUBLICATIONS

Derwent Abstract of WO 2003/009280 A1 (Derwent Acc. No. 2003-175540).

* cited by examiner (a)

(b)

MAGNETIC RECORDING MEDIUM, METHOD FOR PRODUCING THEREOF, AND MAGNETIC RECORDING AND REPRODUCING APPARATUS

CROSS REFERENCE TO RELATED APPLICATIONS

This application is a continuation of U.S. application Ser. No. 10/552,445 filed Oct. 6, 2005, now U.S Pat. No. 7,470,474, which is a National Stage of International Application No. PCT/JP2004/004994 filed on Apr. 7, 2004, which claims benefit of U.S. Provisional Application No. 60/462,298 filed on Apr. 14, 2003.

TECHNICAL FIELD

This invention relates to a magnetic recording medium which is provided on a nonmagnetic substrate with at least an orientation-controlling layer for controlling the orientation of a layer formed directly thereon, a perpendicularly magnetic layer having an easily magnetizing axis oriented mainly perpendicularly relative to the nonmagnetic substrate, and a protective layer, to a method for the production thereof and to a magnetic recording and reproducing apparatus.

BACKGROUND ART

The hard disk drive (HDD) that is one kind of the magnetic recording and reproducing apparatus has the recording density thereof growing at present at an annual rate of 60% or more. The trend of this growth is said to last in the future. Thus, the development of a magnetic recording head and the development of a magnetic recording medium that fit the high recording density are being promoted.

The magnetic recording medium mounted on the magnetic recording and reproducing apparatus currently available in the market is mainly an in-plane magnetic recording medium having the easily magnetizing axis in a magnetic film oriented horizontally relative to the substrate. The term "easily magnetizing axis" as used herein refers to the axis that allows easy orientation of magnetization and, in the case of a Co-based alloy, refers to the c axis in the hcp structure of Co.

In the in-plane magnetic recording medium of this kind, an addition to the recording density results in unduly decreasing the volume of a magnetic layer per recording bit and possibly degrading the read/write property due to the effect of thermal fluctuation. Further, during the augmentation of the recording density, the medium noise tends to increase under the influence of the diamagnetic field that is generated in the boundary region between adjacent recording bits.

In contrast, the so-called perpendicularly magnetic recording medium which has the easily magnetizing axis in the magnetic film oriented mainly perpendicularly, even during the augmentation of the recording medium, suffers only minutely from the influence of the diamagnetic field in the boundary region between adjacent recording bits and, owing to the formation of bright boundary bits, represses the increase of noise. Moreover, it defies the effect of thermal fluctuation because it is capable of repressing the decrease of the volume of recording bits due to the augmentation of the recording density. Such being the case, the perpendicularly magnetic recording has been arresting great attention, and the configurations of a medium fitting the perpendicularly magnetic recording have been proposed in recent years.

In recent years, the feasibility of adopting a single magnetic pole head excelling in the ability to write on the perpendicularly magnetic layer with a view to answering the demand for further augmentation of the recording density of the magnetic recording medium has been being studied. With the object of materializing this single magnetic pole head, the magnetic recording medium which has improved the efficiency of exchange of magnetic flux between the single magnetic pole head and the magnetic recording medium by interposing the so-called lining layer, i.e. a layer formed of a soft magnetic material, between the perpendicularly magnetic layer which is a recording layer and the substrate has been proposed.

When the magnetic recording medium which is merely provided with the lining layer as described above is used, however, it falls short of satisfying the read/write property during the course of reproducing the record, the property of resisting thermal fluctuation and the record resolving power. Thus, the desirability of developing a magnetic recording medium that excels in these properties has been finding recognition.

The reconciliation of the augmentation of the ratio of signal to noise (S/N ratio) during the reproduction, which is particularly important for the read/write property, with the enhancement of the resistance to thermal fluctuation constitutes an essential matter for the sake of the future augmentation of recording density. These two factors have a contradictory relation such that one of them declines unduly when the other is enhanced. The reconciliation of them at a high level poses an important problem.

As one of the problems which encounter the perpendicularly magnetic recording medium, the fact that the use of a magnetic layer of the CoCrPt system which is common to all recording and reproducing magnetic layers results in rendering difficult the acquisition of a proper read/write property because this magnetic layer is deficient in segregation of Cr and insufficient to attain physical separation, fine division and magnetic isolation of magnetic grains may be cited.

In the meanwhile, the utilization of a material containing an oxide in CoCrPt in the magnetic layer of the in-plane magnetic recording medium has been proposed (JP-A 2000-276729, for example).

The magnetic layer of this construction is enabled, by using an oxide instead of relying on segregation of Cr, to attain sufficient separation of grains to a certain extent even in the perpendicularly magnetic medium.

The medium constructed as described above uses a material that decreases the amount of Cr to be added thereto and adds an oxide instead. It, therefore, entails such problems as suffering the coercive force of the magnetic layer to grow excessively and failing to effect thorough recording of data with the head because the smallness of the amount of Cr to be added results in increasing the ratio of Pt in the magnetic grains in the magnetic layer and enlarging the constant of magnetic anisotropy, Ku, of magnetic grains.

It becomes necessary, therefore, to adopt a method for lowering the coercive force of the magnetic layer and effecting thorough recording by resorting to such means as decreasing the thickness of the magnetic layer and increasing the amount of Cr to be added. In the meantime, the fact that the decrease of the thickness of the magnetic layer and the increase of the Cr content result in decreasing the magnetic anisotropy constant Ku of magnetic grains and degrading the nucleation as well entails degradation of the property of thermal fluctuation. Further, the fact that the output during the reproduction of data diminishes results in decreasing the ratio of this output to the system noise inherent in the recording and reproducing system and possibly disrupting the acquisition of a sufficient reproducing property. As a result, the properties to be acquired no longer fit the high-density recording.

In the circumstances, the development of a magnetic recording medium which is endowed with an enhanced property of thermal fluctuation, a sufficient read/write property for high-density recording, a particularly proper data recording property, and a high signal/noise (S/N) ratio during the reproduction has been yearned for.

This invention originated in the appreciation of such true state of affairs as mentioned above and is aimed at providing a magnetic recording medium which possesses an exalted read/write property and an enhanced property of thermal fluctuation and allows information of high density to be recorded and reproduced, a method for the production thereof, and a magnetic recording and reproducing apparatus.

DISCLOSURE OF THE INVENTION

The present invention provides a magnetic recording medium provided on a nonmagnetic substrate with at least an orientation-controlling layer for controlling the orientation of a layer formed directly thereon, a perpendicularly magnetic layer having an easily magnetizing axis oriented mainly perpendicularly relative to the nonmagnetic substrate, and a protective layer, the medium being characterized in that the perpendicularly magnetic layer comprises two or more magnetic layers, that at least one of the magnetic layers is a layer having Co as a main component and containing Pt as well and containing an oxide and that at least another of the magnetic layers is a layer having Co as a main component and containing Cr as well and containing no oxide.

In the magnetic recording medium, the magnetic layer containing the oxide has magnetic crystal grains dispersed therein and the crystal grains penetrate the layer in columnar forms.

In the magnetic recording medium, the oxide is an oxide of at least one nonmagnetic metal selected from among Cr, Si, Ta, Al and Ti.

In the magnetic recording medium, the oxide is $Cr_2O_3$ or $SiO_2$,

In the magnetic recording medium, the magnetic layer containing the oxide has an oxide content of 3 mol % or more and 12 mol % or less.

In the magnetic recording medium, the magnetic layer containing the oxide has Co as a main component and has a Cr content of 0 at % or more and 16 at % or less and a Pt content of 10 at % or more and 25 at % or less.

In the magnetic recording medium, the magnetic layer containing the oxide contains at least one element selected from the group consisting of B, Ta, Mo, Cu, Nd, W, Nb, Sm, Tb, Ru and Re and has a total content of the at least one element is 8 at % or less.

In the magnetic recording medium, the magnetic layer containing no oxide has Co as a main component and has a Cr content of 14 at % or more and 30 at % or less.

In the magnetic recording medium, the magnetic layer containing no oxide has Co as a main component and has a Cr content of 14 at % or more and 30 at % or less and a Pt content of 8 at % or more and 20 at % or less.

In the magnetic recording medium, the magnetic layer containing no oxide contains at least one element selected from the group consisting of B, Ta, Mo, Cu, Nd, W, Nb, Sm, Tb, Ru and Re and has a total content of the at least one element is 8 at % or less.

In the magnetic recording medium, the perpendicularly magnetic layer has the magnetic layer containing no oxide formed on the magnetic layer containing the oxide.

In the magnetic recording medium, the perpendicularly magnetic layer contains two or more oxide-containing layers.

In the magnetic recording medium, the perpendicularly magnetic layer contains two or more layers containing no oxide.

In the magnetic recording medium, the perpendicularly magnetic layer has a nonmagnetic layer between the magnetic layers.

In the magnetic recording medium, the perpendicularly magnetic layer comprises a plurality of magnetic layers each constituted of crystal grains, in which the crystal grains on an upper side are epitaxially grown from the crystal grains on a lower side.

In the magnetic recording medium, each of said magnetic layers is constituted of at least one crystal grain and, during epitaxial growth of the at least one crystal grain constituting an upper magnetic layer from the at least one crystal grain constituting a lower magnetic layer, a ratio of the first mentioned at least one crystal grain to the second mentioned at least one crystal grain corresponds to one to one, one to plurality or plurality to one.

In the magnetic recording medium, the perpendicularly magnetic layer has a ratio of one to one, one to plurality or plurality to one, which ratio is given to at least one crystal grain of the magnetic layer containing the oxide and at least one crystal grain of the magnetic layer containing no oxide, and wherein the at least one crystal grain on an upper side is epitaxially grown from the at least one crystal grain on a lower side.

The invention further provides a method for the production of a magnetic recording medium provided on a nonmagnetic substrate with at least an orientation-controlling layer for controlling the orientation of a layer formed directly thereon, a perpendicularly magnetic layer having an easily magnetizing axis oriented mainly perpendicularly relative to the nonmagnetic substrate, and a protective layer, the method being characterized by forming the perpendicularly magnetic layer of two or more magnetic layers, wherein at least one of the two or more magnetic layers is a layer having Co as a main component, containing Pt as well and containing an oxide and at least another of the two or more magnetic layers is a layer having Co as a main component, containing Cr as well and containing no oxide.

In the method, the magnetic layer containing the oxide has magnetic crystal grains dispersed therein and the crystal grains penetrate the layer in columnar forms.

In the method, the magnetic layer containing no oxide is disposed on the magnetic layer containing the oxide.

In the method, the perpendicularly magnetic layer contains two or more oxide-containing layers.

In the method, the perpendicularly magnetic layer contains two or more layers containing no oxide In the method, the perpendicularly magnetic layer is provided between the magnetic layers with a nonmagnetic layer.

In the method, the perpendicularly magnetic layer has a ratio of one to one, one to plurality or plurality to one, which ratio is given to at least one crystal grain of the magnetic layer containing the oxide and at least one crystal grain of the magnetic layer containing no oxide, and wherein the at least one crystal grain on an upper side is epitaxially grown from the at least one crystal grain on a lower side.

In the method, the perpendicularly magnetic layer is formed using a film-forming gas to which an oxygen gas is added.

The invention further provides a magnetic recording and reproducing apparatus furnished with a magnetic recording medium and a magnetic head for recording and reproducing information in the magnetic recording medium, the apparatus being characterized in that the magnetic recording medium is the magnetic recording medium.

BEST MODE FOR CARRYING OUT THE INVENTION

Figure 1:
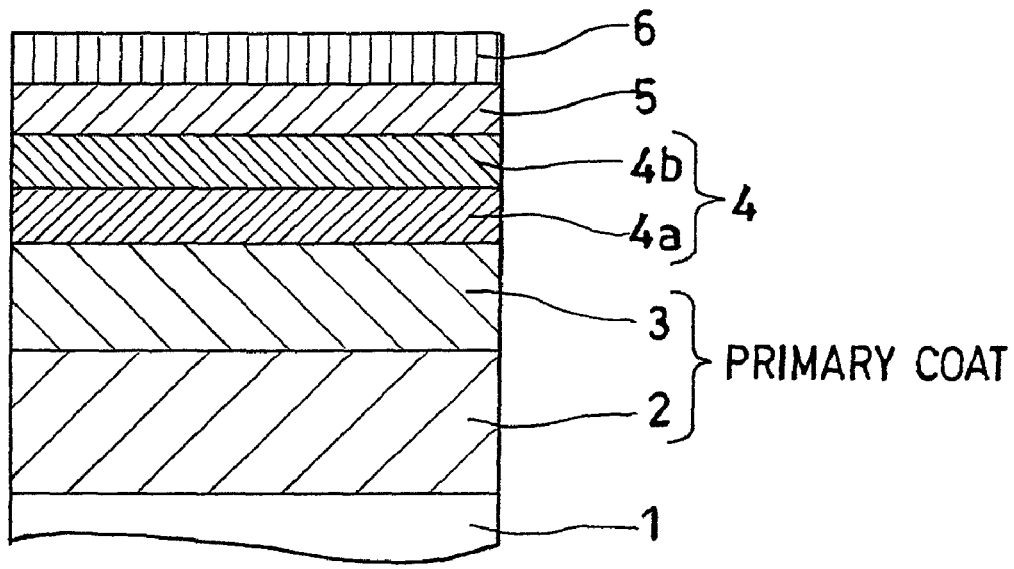
FIG. 1 is a cross section illustrating the construction of one example of the magnetic recording medium contemplated by this invention.

FIG. 1 is a cross section illustrating one example of the configuration of the magnetic recording medium contemplated by the present invention. The magnetic recording medium shown herein has a soft magnetic primary coat 2, an orientation-controlling layer 3, a perpendicularly magnetic layer 4, a protective layer 5 and a lubricating coat 6 formed sequentially in the order mentioned on a nonmagnetic substrate 1. The soft magnetic primary coat 2 and the orientation-controlling layer 3 constitute a primary coat. The perpendicularly magnetic layer 4 is composed of a magnetic layer 4a and a magnetic layer 4b.

As the nonmagnetic substrate 1, a metallic substrate formed of a metallic material, such as aluminum or an aluminum alloy, may be used. Nonmetallic substrates formed of nonmetallic materials, such as glass, ceramic, silicon, silicon carbide and carbon, are also available.

The glass substrates include substrates of materials, such as amorphous glass and glass ceramics. As amorphous glass, general-purpose soda-lime glass and aluminosilicate glass may be used. Then, as the glass ceramics, lithium-based glass ceramics may be used. As the ceramic substrate, sinters having general-purpose aluminum oxide, aluminum nitride and silicon nitride as main components and fiber-reinforced composites of such sinters may be used.

As the nonmagnetic substrate 1, the composites obtained by forming a NiP layer or NiP alloy layer by the technique of plating or sputtering on the surface of the metallic substrate or nonmetallic substrate mentioned above may be used.

The nonmagnetic substrate 1 having an average surface roughness, Ra, of 2 nm (20 Å) or less and preferably 1 nm or less proves favorable because this surface roughness fits the recording of high recording density having the head floated to a low degree.

The surface having a micro-swell (Wa) of 0.3 nm or less (preferably 0.25 nm or less) proves favorable because it fits the recording of high recording density having the head floated to a low degree. The use of an average surface roughness, Ra, of 10 nm or less (preferably 9.5 nm or less) for at least either of the chamfered part and the lateral face part of the end face proves favorable for the sake of the flight stability of the magnetic head. The micro-swell (Wa) can be determined, for example, as the average surface roughness in the range of measurement of 80 μm by using a surface roughness-testing device (made by KLM-Tencor Corp., U.S.A. and sold under the product code of "P-12").

The soft magnetic primary coat 2 is provided for the purpose of enlarging the perpendicular component of the magnetic flux generated from the magnetic head relative to the substrate and fixing the direction of magnetization of the perpendicularly magnetic layer 4 for recording information more steadily to the direction perpendicular to the nonmagnetic substrate 1. This function is at an advantage in becoming more conspicuous particularly when a single magnetic pole head for perpendicular recording is used as the magnetic recording and reproducing head.

The soft magnetic primary coat 2 is formed of a soft magnetic material. As the material, materials containing Fe, Ni and Co are available.

As concrete examples of the material, FeCo-based alloys (such as FeCo and FeCoV), FeNi-based alloys (such as FeNi, FeNiMo, FeNiCr and FeNiSi), FeAl-based alloys (such as FeAl, FeAlSi, FeAlSiCr, FeAlSiTiRu and FeAlO), FeCr-based alloys (such as FeCr, FeCrTi and FeCrCu), FeTa-based alloys (such as FeTa, FeTaC and FeTaN), FeMg-based alloys (such as FeMgO), FeZr-based alloys (such as FeZrN), FeC-based alloys, FeN-based alloys, FeSi-based alloys, FeP-based alloys, FeNb-based alloys, FeHf-based alloys and FeB-based alloys may be cited.

Materials of microcrystalline structures of FeAlO, FeMgO, FeTaN and FeZrN containing 60 at % or more of Fe, or granular structures having fine crystal grains dispersed in a matrix, may be used.

As the material for the soft magnetic primary coat 2, Co alloys having an amorphous structure containing 80 at % or more of Co and containing at least one member selected from the group consisting of Zr, Nb, Ta, Cr and Mo may be used besides the materials enumerated above.

As preferred concrete examples of the material of Co alloy, CoZr-, CoZrNb-, CoZrTa-, CoZrCr- and CoZrMo-based alloys may be cited.

The coercive force, Hc, of the soft magnetic primary coat 2 is preferred to be 200 (Oe) or less (preferably 50 (Oe) or less).

If this coercive force, Hc, exceeds the limit mentioned above, the excess will be at a disadvantage in unduly lowering the soft magnetic property and suffering the waveform of reproduction to assume a shape distorted from the so-called rectangular wave.

The saturated magnetic flux density, Bs, of the soft magnetic primary coat 2 is preferred to be 0.6 T or more (preferably 1 T or more). If this magnitude, Bs, falls short of the limit mentioned above, the shortage is at a disadvantage in compelling the waveform of reproduction to assume a shape distorted from the so-called rectangular wave.

Further, the product Bs·t (T·nm) of the saturated magnetic flux density, Bs (T), of the soft magnetic primary coat 2 multiplied by the thickness, t (nm), of the soft magnetic primary coat 2 is preferred to be 20 (T·nm) or more (preferably 40 (T·nm) or more). If this magnitude, Bs·t, falls short of the limit mentioned above, the shortage will be at a disadvantage in causing the waveform of reproduction to deform and degrading the OW (Over Write) property (writing property).

It is preferred that the outermost surface of the soft magnetic primary coat 2 (the surface on the orientation-controlling layer 3 side) be formed by having the material forming the soft magnetic primary coat 2 partially or wholly oxidized. Preferably, the material forming the soft magnetic primary coat 2 is partially or wholly oxidized or the oxide of the material is formed and disposed on the surface of the soft magnetic primary coat 2 (the surface on the orientation-controlling layer 3 side) and in the vicinity thereof, for example.

Since the magnetic fluctuation of the surface of the soft magnetic primary coat 2 is consequently repressed, it is made possible to allay the noise due to the magnetic fluctuation and improve the read/write property of the magnetic recording medium.

The improvement of the read/write property can otherwise be attained by finely dividing the crystal grains of the orientation-controlling layer 3 formed on the soft magnetic primary coat 2.

The oxidized part of the surface of the soft magnetic primary coat 2 can be formed by a method which comprises forming a soft magnetic primary coat 2 and subsequently exposing this primary coat to an oxygen-containing atmosphere or a method which consists in introducing oxygen to the soft magnetic primary coat 2 during the process of molding into a film the part of the primary coat approximating the surface thereof. To be specific, the exposure of the surface of the soft magnetic primary coat 2 to oxygen is accomplished by allowing the surface to remain in a gaseous atmosphere formed solely of oxygen or oxygen diluted with a gas, such as argon or nitrogen, for a period in the approximate range of 0.3 to 20 seconds. Otherwise, the surface may be exposed to the air. Particularly when the gas formed by diluting oxygen with a gas, such as argon or nitrogen, is used, the production is stably implemented because the degree of oxidization of the surface of the soft magnetic primary coat 2 is easily adjusted. When the oxygen is introduced to the gas being used for molding the soft magnetic substrate 1 in the form of a film, the technique of sputtering adopted for the molding of the film may be performed by using a process gas incorporating oxygen therein only in part of the time spent for the molding of film. As the process gas, a gas formed by mixing argon with 0.05% to 50% (preferably 0.1 to 20%) of oxygen in volume ratio is used favorably.

The orientation-controlling layer 3 is intended to control the orientation and the grain diameter of the perpendicularly magnetic layer 4 to be placed directly thereon.

Though the material for this layer does not need to be particularly restricted, a material having the hcp structure, fcc structure or amorphous structure proves favorable. Ru-based alloys, Ni-based alloys, Co-based alloys and Pt-based alloys prove particularly favorable.

As the Ni-based alloy, for example, the material formed of at least one kind selected from the group consisting of NiTa alloys, NiNb alloys, NiTi alloys and NiZr alloys containing 33 to 80 at % of Ni proves favorable. The nonmagnetic material containing 33 to 80 at % of Ni and containing one or more elements selected from the group consisting of Sc, Y, Ti, Zr, Hf, Nb, Ta and Co is available likewise. In this case, the Ni content is preferred to fall in the range of 33 at % to 80 at % for the sake of enabling the orientation-controlling layer to retain the inherent effect and avoid acquiring a magnetic property.

For this reason, the magnetic recording medium in the present embodiment is preferred to limit the thickness of the orientation-controlling layer 3 in the range of 0.5 to 40 nm (preferably 1 to 20 nm). When the thickness of the orientation-controlling layer 3 is in the range of 0.5 to 40 nm (preferably 1 to 20 nm), the perpendicular orientation of the perpendicularly magnetic layer 4 can be particularly heightened and the distance between the magnetic head and the soft magnetic primary coat 2 during the course of recording can be decreased. Thus, the read/write property can be exalted without entailing any decrease of the reproduced signal resolving power.

If this thickness falls short of the limit mentioned above, the shortage will result in lowering the perpendicular orientation in the perpendicularly magnetic layer 4 and degrading the read/write property and the resistance to thermal fluctuation.

If the thickness exceeds the limit mentioned above, the excess will be at a disadvantage in unduly adding to the magnetic particle diameter of the perpendicularly magnetic layer 4 and possibly degrading the noise property. The distance between the magnetic head and the soft magnetic primary coat 2 is enlarged during the course of recording. This increase of the distance is at a disadvantage in degrading the reproduced signal resolving power and the output of reproduction.

The surface contour of the orientation-controlling layer 3 affects the surface contours of the perpendicularly magnetic layer 4 and the protective layer 5. For the purpose of diminishing the surface irregularities of the magnetic recording medium and decreasing the flying height of the magnetic head during the course of recording and reproducing operation, the average surface roughness, Ra, of the orientation-controlling layer 3 is preferred to be 2 nm or less.

By controlling the average surface roughness, Ra, to a level of 2 nm or less, it is made possible to diminish the surface irregularities of the magnetic recording medium, attain satisfactory decrease of the flying height of the magnetic head during the course of recording and reproducing operation and exalt the recording density.

The gas used for molding the orientation-controlling layer 3 in the form of a film may incorporate therein oxygen and nitrogen. When the sputtering technique is adopted as the method of molding the film, for example, the gas obtained by mixing argon with about 0.05 to 50% (preferably 0.1-20%) of oxygen in volume ratio and the gas obtained by mixing argon with about 0.01 to 20% (preferably 0.02 to 10%) of nitrogen in volume ratio are favorably used as the process gas.

The orientation-controlling layer may be formed in a structure having metal grains dispersed in an oxide, metal nitride or metal carbide. The formation of this structure is realized by using an alloy material containing an oxide, metal nitride or metal carbide. $SiO_2$, $Al_2O_3$, $Ta_2O_5$, $Cr_2O_3$, MgO, $Y_2O_3$ and $TiO_2$ are available as oxides. AlN, $Si_3N_4$, TaN and CrN are available as metal nitrides. TaC, BC and SiC are available as metal carbides. As concrete examples of the alloy, NiTa—$SiO_2$, RuCo—$Ta_2O_5$, Ru—$SiO_2$, Pt—$Si_3N_4$ and Pd—TaC may be cited.

The content of the oxide, metal nitride or metal carbide in the orientation-controlling layer 3 is preferred to be 4 mol % or more and 12 mol % or less based on the amount of the alloy. If the content of the oxide, metal nitride or metal carbide in the orientation-controlling layer 3 exceeds the upper limit mentioned above, the excess will be at a disadvantage in suffering the formed metal grains to entrain a residue of the oxide, metal nitride or metal carbide, impairing the crystallinity and the orientation of the metal grains and impairing the crystallinity and the orientation of the magnetic layer formed on the orientation-controlling layer 3 as well. If the content of the oxide, metal nitride or metal carbide in the orientation-controlling layer 3 falls short of the lower limit mentioned above, the shortage is at a disadvantage in preventing the addition of the oxide, metal nitride or metal carbide from manifesting the effect aimed at.

Figure 2:
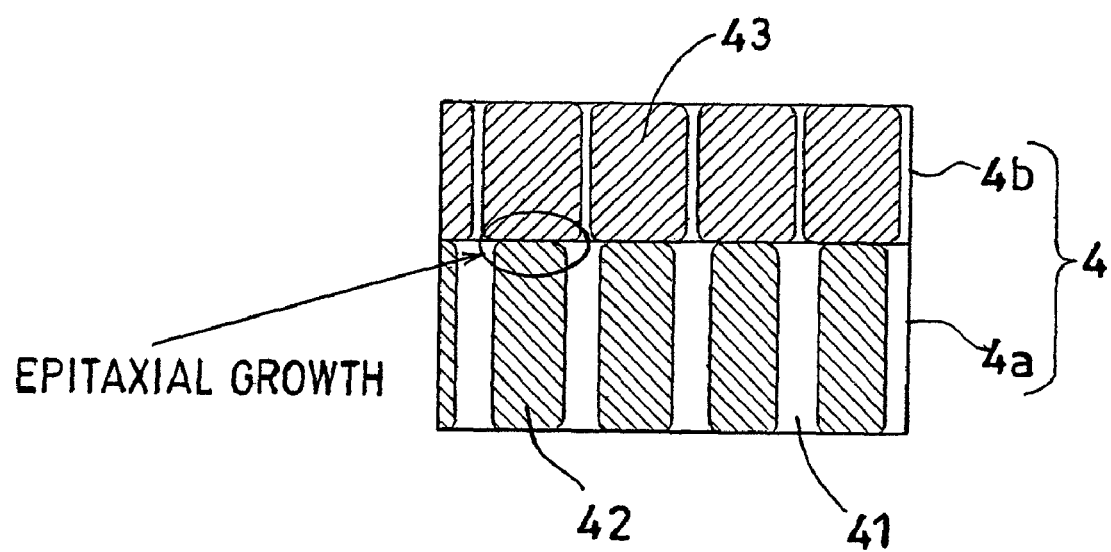
FIG. 2 is a cross section illustrating the construction of a perpendicularly magnetic layer.

FIG. 2 is a cross section illustrating the construction of a perpendicularly magnetic layer. The perpendicularly magnetic layer 4 has the easily magnetizing axis thereof oriented in the direction perpendicular to the nonmagnetic substrate. It is composed of a magnetic layer 4a having Co as a main component thereof, containing at least Pt as well and containing an oxide 41 and a magnetic layer 4b having Co as a main component thereof, containing at least Cr as well and containing no oxide.

The magnetic layer 4a is formed of a material having Co as a main component, containing at least Pt as well and further containing the oxide 41. This oxide 41 is preferred to be an oxide of Cr, Si, Ta, Al, Ti or Mg. Among other oxides enumerated above, $Cr_2O_3$ and $SiO_2$ prove particularly favorable. Further, the magnetic layer 4a in the present embodiment contains Pt.

The magnetic layer 4a is preferred to have magnetic grains (crystal grains endowed with crystallinity) 42 dispersed therein. The magnetic grains 42 are preferably formed in a columnar structure that vertically pierces the magnetic layer 4a as illustrated in FIG. 2. By forming this structure, it is made possible to enhance the orientation and the crystallinity of the magnetic grains 42 of the magnetic layer 4a and consequently acquire a signal/noise (S/N) ratio suitable for high-density recording.

For the acquisition of this structure, the amount of the oxide 41 to be contained constitutes an important factor.

The content of the oxide 41 is preferred to be 3 mol % or more and 12 mol % or less based on the total amount of Co, Cr and Pt. More preferably, the content is 5 mol % or more and 10 mol % or less.

Figure 3:
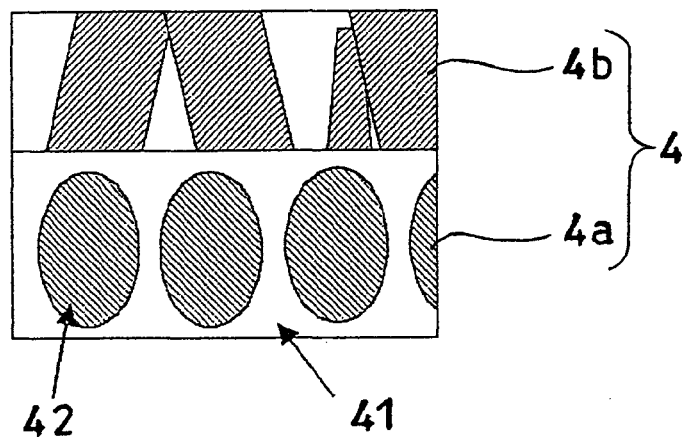
FIG. 3 is a diagram illustrating a case in which the magnetic grains do not form a columnar structure in the magnetic layer.

The range specified above for the content of the oxide in the magnetic layer 4a is preferable because the oxide can be educed around the magnetic grains 42 during the formation of a layer and used for isolating and finely dividing the magnetic grains 42 (FIG. 2). If the content of the oxide exceeds the upper limit of the range mentioned above, the excess will be at a disadvantage in suffering the oxide to survive as a residue in the magnetic grains, impairing the orientation and the crystallinity of the magnetic grains, further inducing deposition of the oxide 41 above and below the magnetic grains 42 as illustrated in FIG. 3, and consequently preventing the magnetic grains 42 from forming a columnar structure vertically piercing the magnetic layer 4a. If the content of the oxide falls short of the lower limit of the range mentioned above, the shortage will be at a disadvantage in preventing the magnetic grains from being satisfactorily separated and finely divided and consequently exalting the noise during the course of recording and reproducing operation and obstructing the acquisition of a signal/noise (S/N) ratio suitable for high-density recording.

The content of Cr in the magnetic layer 4a is preferred to be 6 at % or more and 16 at % or less (more preferably 10 at % or more and 14 at % or less). The reason for specifying the range mentioned above for the Cr content is that the Cr content in this range is proper for the purpose of preventing the magnetic anisotropy constant, Ku, of the magnetic grains from being unduly lowered, maintaining the magnetization at a high level, and consequently enabling the magnetic layer to acquire a read/write property and a property of thermal fluctuation appropriate for high-density recording.

If the Cr content exceeds the upper limit of the range mentioned above, the excess will be at a disadvantage in unduly lowering the magnetic anisotropy constant, Ku, of the magnetic grains and degrading the property of thermal fluctuation and degrading the crystallinity and the orientation of the magnetic grains and consequently impairing the read/write property. If the Cr content falls short of the lower limit of the range mentioned above, the shortage will be at a disadvantage in unduly heightening the magnetic anisotropy constant, Ku, of the magnetic grains, suffering the perpendicular coercive force to increase excessively and compelling the produced magnetic layer to acquire a recording property (OW) incapable of allowing sufficiently writing on the head during the recording of data and consequently unfit for high-density recording.

The Pt content of the magnetic layer 4a is preferred to be 10 at % or more and 20 at % or less. The reason for specifying the range mentioned above for the Pt content is that the magnetic anisotropy constant, Ku, necessary for perpendicularly magnetic layer is obtained, that the magnetic grains manifest fine crystallinity and orientation and that the property of thermal fluctuation and the read/write property consequently acquired are suitable for high-density recording.

If the Pt content exceeds the upper limit of the range mentioned above, the excess will be at a disadvantage in suffering the magnetic grains to form a layer of fcc structure and possibly impairing the crystallinity and the orientation of the magnetic grains. If the Pt content falls short of the lower limit of the range mentioned above, the shortage will be at a disadvantage in disabling the acquisition of the magnetic anisotropy constant, Ku, necessary for obtaining the property of thermal fluctuation proper for high-density recording.

The magnetic layer 4a is allowed to contain at least one element selected from the group consisting of B, Ta, Mo, Cu, Nd, W, Nb, Sm, Tb, Ru and Re besides Co, Cr, Pt and the oxide. By containing the elements mentioned above, it is made possible to promote the fine division of the magnetic grains, exalt the crystallinity and the orientation thereof and acquire a read/write property and a property of thermal fluctuation suitable for high-density recording.

The total content of the elements mentioned above is preferred to be 8 at % or less. If this total content exceeds 8 a %, the excess will be at a disadvantage in suffering the magnetic grains to form a phase other than the hcp phase therein, causing turbulence of the crystallinity and the orientation of the magnetic grains, and consequently obstructing the acquisition of a read/write property and a property of thermal fluctuation suitable for high-density recording.

As concrete examples of the material suitable for the magnetic layer 4a, (Co14Cr18Pt)90-($SiO_2$)10 {90 mol % of a metal composition comprising 14 at % of Cr content, 18 at % of Pt content and the balance of Co and 10 mol % of an oxide composition comprising $SiO_2$}, (Co10Cr16Pt)92-($SiO_2$)8 {92 mol % of a metal composition comprising 10 at % of Cr content, 16 at % of Pt content and the balance of Co and 8 mol % of an oxide composition comprising $SiO_2$}, (Co8Cr14Pt4Nb)94-($Cr_2O_3$)6 {94 mol % of a metal composition comprising 8 at % of Cr content, 14 at % of Pt content, 4 at % of Nb content and the balance of Co and 6 mol % of an oxide composition comprising $Cr_2O_3$}, and (CoCrPt)—($Ta_2O_5$), (CoCrPtMo)—(TiO), (CoCrPtW)—($TiO_2$), (CoCrPtB)—($Al_2O_3$), (CoCrPtTaNd)—(MgO), (CoCrPtBCu)—($Y_2O_3$) and (CoCrPtRe)—($SiO_2$) may be cited.

The magnetic layer 4b is formed of a material having Co as a main component and containing at least Cr. It is preferably formed in a structure having magnetic grains 43 epitaxially grown from the magnetic grains 42 in the magnetic layer 4a as illustrated in FIG. 2. In this case, the magnetic grains 42 of the magnetic layer 4b and the magnetic grains 43 of the magnetic layer 4a may form any of the ratios of one to one, plurality to one, and one to plurality.

The epitaxial growth of the magnetic grains 43 of the magnetic layer 4b from the magnetic grains 42 of the magnetic layer 4a is at an advantage in promoting fine division of the magnetic grains 43 of the magnetic layer 4b and further exalting the crystallinity and the orientation thereof.

The Cr content of the magnetic layer 4b is preferred to be 14 at % or more and 26 at % or less. The specification of the range mentioned above for the Cr content is at an advantage in enabling the reproduction of data to yield a sufficient output and ensuring acquisition of a proper property of thermal fluctuation.

If the Cr content exceeds the upper limit of the range mentioned above, the excess will be at a disadvantage in unduly diminishing the magnetization of the magnetic layer 4b. If this Cr content falls short of the lower limit of the range mentioned above, the shortage will be at a disadvantage in preventing the magnetic grains from being satisfactorily separated and finely divided, suffering the noise during the course of recording and reproducing operation to increase and obstructing the acquisition of a signal/noise (S/N) ratio suitable for high-density recording.

It is allowed that the magnetic layer 4b is formed of a material containing Pt besides Co and Cr. The Pt content of the magnetic layer 4b is preferred to be 8 at % or more and 20 at % or less. The reason for specifying the range mentioned above for the Pt content is that the satisfactory coercive force suitable for high-density recording is obtained, that the high output of reproduction is maintained during the course of recording and reproducing operation and consequently that the read/write property and the property of thermal fluctuation suitable for high-density recording are obtained.

If the Pt content exceeds the upper limit of the range mentioned above, the excess will be at a disadvantage in suffering the magnetic layer to form a phase of an fcc structure therein and consequently impairing the crystallinity and the orientation of the magnetic layer. If the Pt content falls short of the lower limit of the range mentioned above, the shortage will be at a disadvantage in obstructing the acquisition of the magnetic anisotropy content, Ku, for obtaining the property of thermal fluctuation suitable for high-density recording.

The magnetic layer 4b is allowed to contain at least one element selected from the group consisting of B, Ta, Mo, Cu, Nd, W, Nb, Sm, Tb, Ru and Re in addition to Co, Cr, Pt and oxide. By containing the element mentioned above, the magnetic layer is enabled to promote fine division of magnetic grains or enhance the crystallinity and the orientation and acquire a read/write property and a property of thermal fluctuation suitable for high-density recording.

The total content of the elements mentioned above is preferred to be 8 at % or less. If the total content exceeds 8 at %, the excess will be at a disadvantage in suffering the magnetic grains to form a phase other than the hcp phase and inducing turbulence of the crystallinity and the orientation of the magnetic grains and consequently impeding the acquisition of a read/write property and a property of thermal fluctuation suitable for high-density recording.

As concrete examples of the material suitable for the magnetic layer 4b, Co16-28Cr {16 to 28 at % of Cr and the balance of Co} in the CoCr system, Co14-30Cr1-4Ta {14 to 30 at % of Cr content, 1 to 4 at % of Ta content and the balance of Co} in the CoCrTa system, Co14-26Cr1-5Ta1-4B {14 to 26 at % of Cr content, 1 to 5 at % of Ta content, 1 to 4 at % of B content and the balance of Co} in the CoCrTaB system, Co14-30Cr1-5B1-4Nd {14 to 30 at % of Cr content, 1 to 5 at % of B content, 1 to 4 at % of Nd content and the balance of Co} in the CoCrBNd system, Co16-24Cr10-18Pt1-6B {16 to 24 at % of Cr content, 10 to 18 at % of Pt content, 1 to 6 at % of B content and the balance of Co} in the CoCrPtB system, Co16-24Cr10-20Pt1-7Cu {16 to 24 at % of Cr content, 10 to 20 at % of Pt content, 1 to 7 at % of Cu content and the balance of Co} in the CoCrPtCu system, Co16-26Cr10-20Pt1-4Ta1-4Nd {16 to 26 at % of Cr content, 10 to 20 at % of Pt content, 1 to 4 at % of Ta content, 1 to 4 at % of Nd content and the balance of Co} in the CoCrPrPtTaNd system, Co16-26Cr8-18Pt1-6Nb {16 to 26 at % of Cr content, 8 to 18 at % of Pt content, 1 to 6 at % of Nb content and the balance of Co} in the CoCrPtNb system, and CoCrPtBNd, CoCrPtBW, CoCrPtMo, CoCrPtCuRu and CoCrPtRe may be cited.

The perpendicular coercive force (Hc) of the perpendicularly magnetic layer 4 is preferred to be 2500 [Oe] or more. If the coercive force falls short of 2500 [Oe], the shortage will be at a disadvantage in degrading the read/write property and particularly the frequency property, impairing the property of thermal fluctuation and rendering the produced magnetic layer unfit as a high-density recording medium.

The nucleation (−Hn) of the perpendicularly magnetic layer 4 is preferred to be 1000 [Oe] or more. If the nucleation (Hn) falls short of 1000 [Oe], the shortage will be at a disadvantage in rendering the produced magnetic layer deficient in the property of thermal fluctuation.

The nucleation (−Hn) is expressed by the distance [Oe] from the M axis to the point c in an MH curve obtained as by VSM, in which the point a represents the point at which the external magnetic field in the process of being decreased from the state in which the magnetization is saturated reaches 0 and the point c represents the point at which the line formed by extending the tangent line of the MH curve at the point b at which the magnetization of the MH curve is 0 intersects the saturated magnetization.

Figure 4:
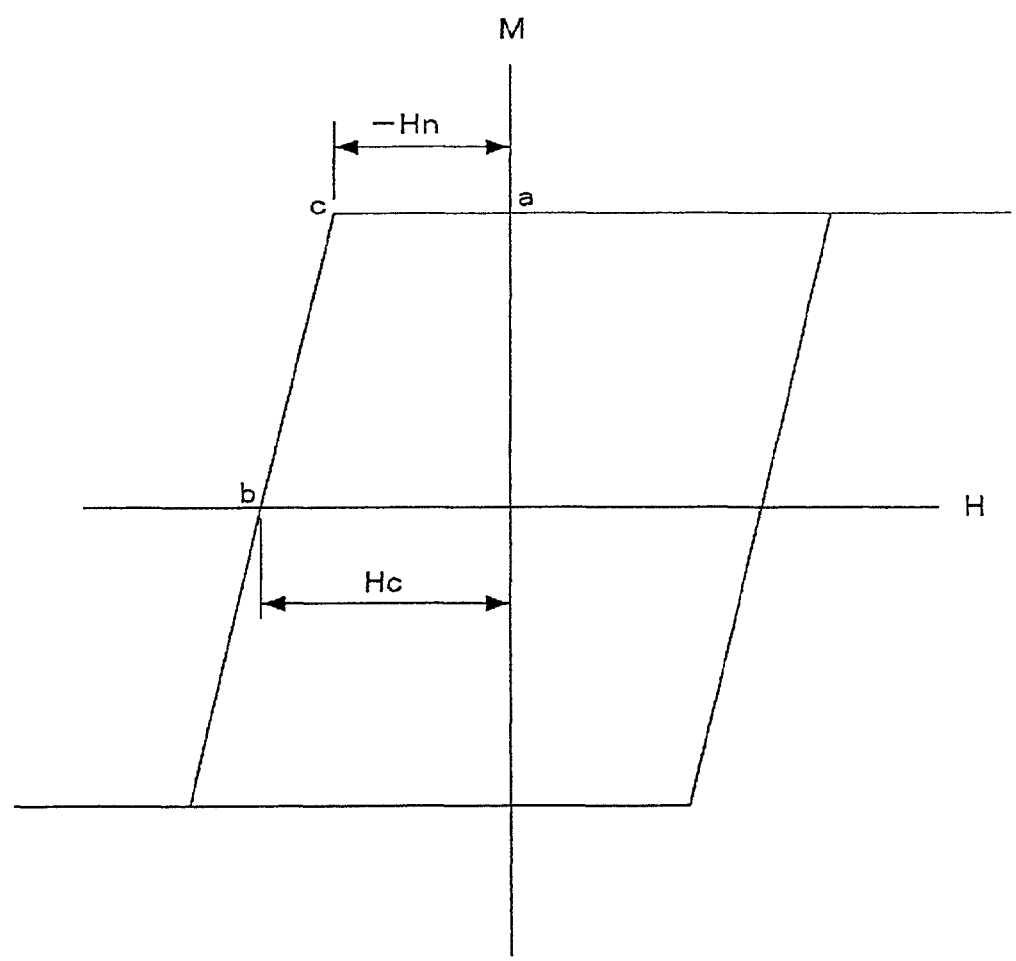
FIG. 4 is a diagram illustrating one example of the MH curve.
Figure 5:
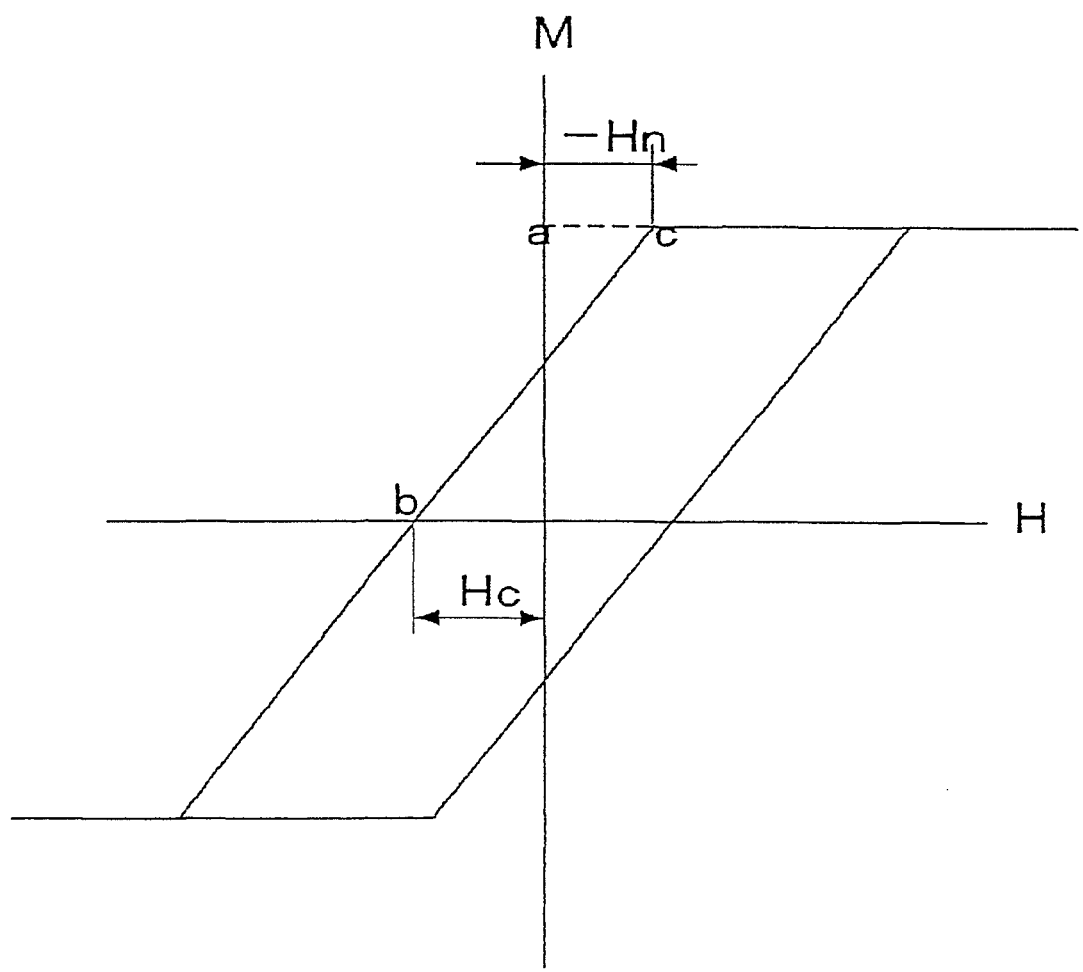
FIG. 5 is a diagram illustrating another example of the MH curve.

Incidentally, the nucleation (−Hn) assumes a positive value when the point c falls in the region in which the external magnetic field is negative (refer to FIG. 4) and a negative value when the point c falls in the region in which the external magnetic field is positive (refer to FIG. 5).

In the perpendicularly magnetic layer 4, the average particle diameter of the magnetic grains is preferred to fall in the range of 5 to 15 nm. This average particle diameter can be found through observing the perpendicularly magnetic layer 4 under a TEM (transmission electron microscope) and processing the observed image.

The thickness of the perpendicularly magnetic layer 4 is preferred to fall in the range of 5 to 40 nm. If the thickness of the perpendicularly magnetic layer 4 falls short of the lower limit of the range mentioned above, the shortage would result in obstructing the acquisition of a satisfactory output of reproduction and degrading the property of thermal fluctuation. If the thickness of the perpendicularly magnetic layer 4 exceeds the upper limit of the range mentioned above, the excess will be at a disadvantage in enlarging the magnetic grains in the perpendicularly magnetic layer 4, exalting the noise during the course of recording and reproducing operation and degrading the read/write property represented by the signal/noise (S/N) ratio and the recording property (OW).

The protective layer 5 is intended to prevent the perpendicularly magnetic layer 4 from corrosion and, at the same time, preventing the surface of the recording medium from sustaining injury when the magnetic head contacts the medium. It can use any of the materials heretofore known to the art. For example, a material containing C, $SiO_2$ and $ZrO_2$ may be used.

The thickness of the protective layer 5 falling in the range of 1 to 10 nm proves advantageous in terms of high recording density because this thickness allows a decrease in the distance between the head and the medium.

The lubricating layer 6 is preferred to have a lubricating agent, such as perfluoropolyether, fluorinated alcohol or fluorinated carboxylic acid, incorporated therein.

The magnetic recording medium of this invention is provided on a nonmagnetic substrate 1 with at least an orientation-controlling layer 3 for controlling the orientation of a layer placed directly thereon, a perpendicularly magnetic layer 5 having an easily magnetizing axis oriented mainly perpendicularly relative to the nonmagnetic substrate 1, and a protective layer 5 and characterized by the perpendicularly magnetic layer 4 comprising two or more magnetic layers, at least one of the magnetic layers being a magnetic layer 4a having Co as a main component and containing Cr as well and containing an oxide and another thereof being a magnetic layer 4b having Co as a main component and containing Cr and containing no oxide. Owing to this configuration, it is made possible to obtain a medium which promotes fine division and magnetic isolation of magnetic grains, markedly enhances the signal/noise (S/N) ratio during the course of reproduction, exalts the property of thermal fluctuation by improving the nucleation (−Hn), and possesses an excellent recording property (OW).

Figure 6:
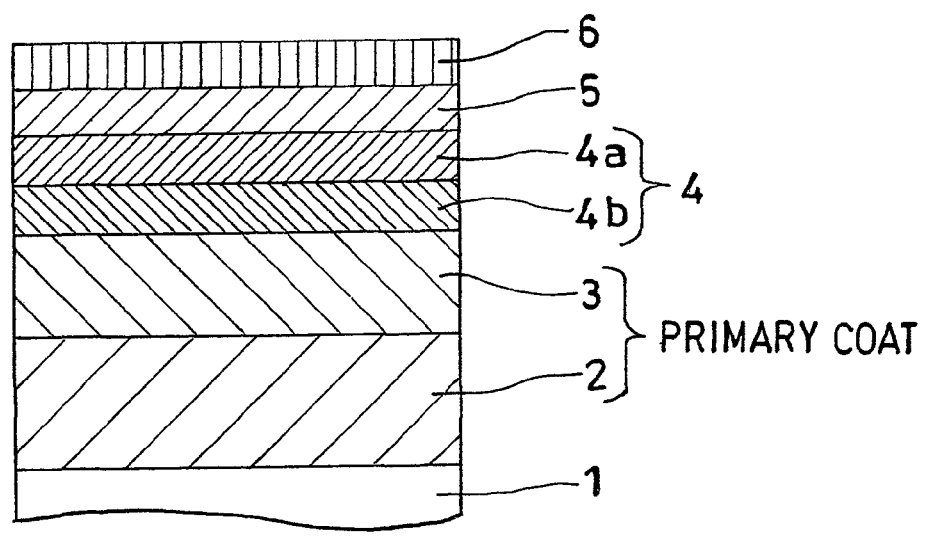
FIG. 6 is a cross section illustrating the construction of another example of the magnetic recording medium contemplated by this invention.

In another mode of embodying this invention, the perpendicularly magnetic layer 4 may be formed in a structure obtained by forming a magnetic layer 4b containing no oxide as illustrated in FIG. 6 and forming an oxide-containing magnetic layer 4a thereon.

Figure 7:
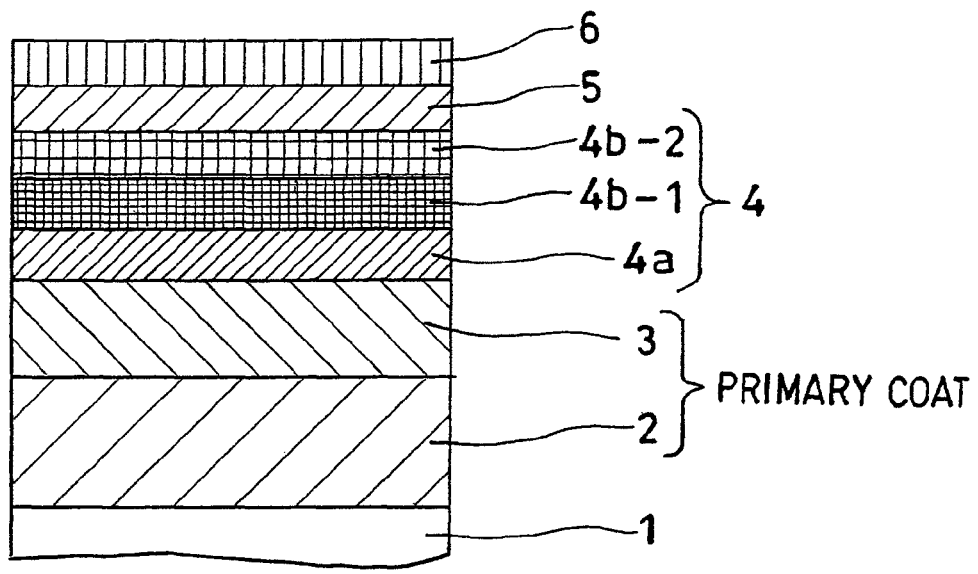
FIG. 7 is a cross section illustrating the construction of yet another example of the magnetic recording medium contemplated by this invention.
Figure 8:
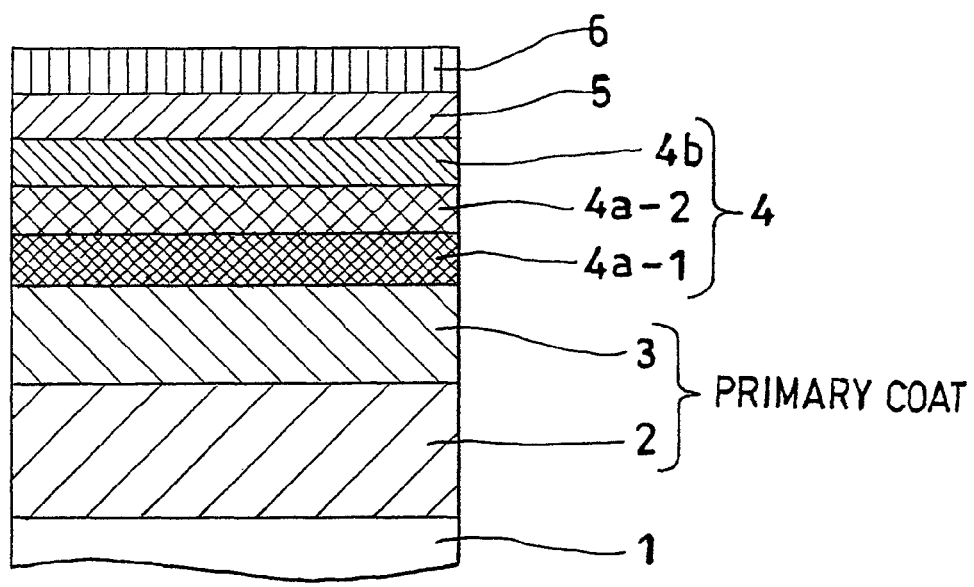
FIG. 8 is a cross section illustrating the construction of still another example of the magnetic recording medium contemplated by this invention.
Figure 9:
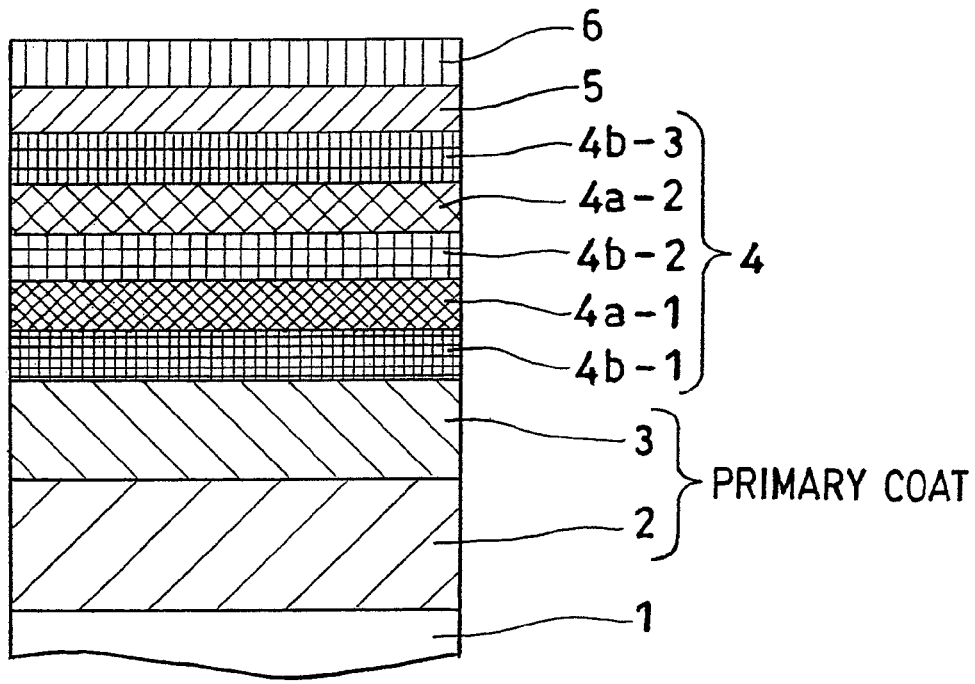
FIG. 9 is a cross section illustrating the construction of a further example of the magnetic recording medium contemplated by this invention.

This invention allows the perpendicularly magnetic layer 4 to be formed of three or more magnetic layers. For example, it is permissible to form magnetic layers 4b-1 and 4b-2 containing no oxide on an oxide-containing magnetic layer 4a as illustrated in FIG. 7. It is alternatively permissible to form a magnetic layer 4b containing no oxide on oxide-containing magnetic layers 4a-1 and 4a-2 as illustrated in FIG. 8. It is otherwise permissible to have oxide-containing magnetic layers 4a-1 and 4a-1 interposed between the magnetic layers 4b-1 and 4b-2 containing no oxide and between the magnetic layers 4b-2 and 4b-3 containing no oxide as illustrated in FIG. 9. Particularly, since the combination of various magnetic materials results in facilitating the control and the adjustment of various properties, such as the property of thermal fluctuation, recording property (OW) and signal/noise (S/N) ratio, it is especially advantageous to have the perpendicularly magnetic layer 4 formed with three or more layers.

Figure 10:
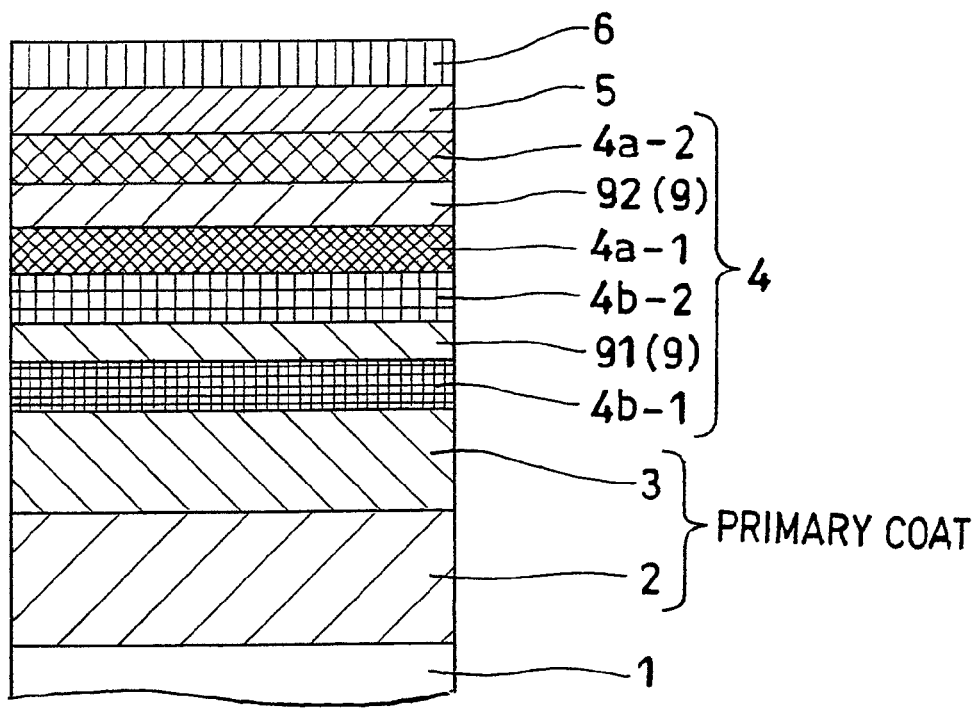
FIG. 10 is a cross section illustrating the construction of another example of the magnetic recording medium contemplated by this invention.

This invention allows the perpendicularly magnetic layer 4 to have nonmagnetic layers interposed one each between the component magnetic layers thereof. This structure results in preventing the magnetic grains from being enlarged, enabling the particle diameter to be controlled and consequently exalting the signal/noise (S/N) ratio further. It is permissible to have a nonmagnetic layer 91 interposed between the magnetic layers 4b-1 and 4b-2 containing no oxide and have a nonmagnetic layer 92 interposed between the magnetic layers 4a-1 and 41-2 each containing an oxide and placed thereon as illustrated in FIG. 10.

The nonmagnetic layer 9 to be interposed between the component magnetic layers of the perpendicularly magnetic layer 4 is preferred to use a material possessing an hcp structure. It is advantageous to use a CoCr alloy or a CoCrX1 alloy (wherein X1 denotes at least one element selected from the group consisting of Pt, Ta, Zr, Re, Ru, Cu, Nb, Ni, Mn, Ge, Si, O, N, W, Mo, Ti, V, Zr and B), for example.

The Co content of the nonmagnetic layer 9 to be interposed between the component magnetic layers of the perpendicularly magnetic layer 4 is preferred to fall in the range of 30 to 70 at %. The reason for this range is that the nonmagnetic layer 9 having this Co content assumes a nonmagnetic property.

As the alloy possessing an hcp structure and used for the nonmagnetic layer 9 to be interposed between the component magnetic layers of the perpendicularly magnetic layer 4, alloys of Ru, Re, Ti, Y, Hf and Zn are available.

Then, as the nonmagnetic layer 9 to be interposed between the component magnetic layers of the perpendicularly magnetic layer 4, a metal or an alloy assuming other structure may be used in an amount falling in the range in which the crystallinity and the orientation of the magnetic layers vertically opposed across the interposed layer are not impaired. As concrete examples of the material for the nonmagnetic layer 9, elements, such as Pd, Pt, Cu, Ag, Au, Ir, Mo, W, Ta, Nb, V, Bi, Sn, Si, Al, C, B and Cr, and alloys thereof may be cited. Particularly, as Cr alloys, it is proper to use CrX2 (wherein X2 denotes one or more elements selected from the group consisting of Ti, W, Mo, Nb, Ta, Si, Al, B, C and Zc) alloys. In this case, the Cr content is preferred to be 60 at % or more.

The nonmagnetic layer 9 to be interposed between the component magnetic layers constituting the perpendicularly magnetic layer 4 may be formed in a structure having the metal grains of the alloy mentioned above dispersed in an oxide, a metal nitride or a metal carbide. More advantageously, the metal grains possess a columnar structure vertically piercing the nonmagnetic layer 9. The formation of this structure is realized by using an alloy material containing an oxide. $SiO_2$, $Al_2O_3$, $Ta_2O_5$, $Cr_2O_3$, MgO, $Y_2O_3$, and $TiO_2$ are usable as oxides, AlN, $Si_3N_4$, TaN and CrN as metal nitrides, and TaC, BC and SiC as metal carbides. As concrete examples of the alloy, CoCr—$SiO_2$, CoCrPt—$Ta_2O_5$, Ru—$SiO_2$, Ru—$Si_3N_4$ and Pd—TaC may be cited.

The content of an oxide, a metal nitride or a metal carbide in the nonmagnetic layer 9 to be interposed between the component magnetic layers of the perpendicularly magnetic layer 4 is preferred to be 4 mol % or more and 12 mol % or less based on the amount of the alloy. If the content of the oxide, metal nitride or metal carbide in the nonmagnetic layer 9 exceeds the upper limit of the range mentioned above, the excess will be at a disadvantage in suffering the metal grains to retain the oxide, metal nitride or metal carbide as a residue, impairing the crystallinity and the orientation of the metal grains, inevitably inducing precipitation of the oxide, metal nitride or metal carbide above and below the metal grains, allowing the metal grains to form a columnar structure vertically piercing the nonmagnetic layer 9 only with difficulty and possibly impairing the crystallinity and the orientation of the magnetic layer formed on the nonmetallic layer 9. If the content of the oxide, metal nitride or metal carbide in the nonmagnetic layer 9 falls short of the lower limit of the range mentioned above, the shortage is at a disadvantage in preventing the addition of the oxide, metal nitride or metal carbide from manifesting the effect thereof.

The thickness of the nonmagnetic layer 9 is preferred to be 10 nm or less (more preferably 5 nm or less) lest the enlarged magnetic grains in the perpendicularly magnetic layer 4 should degrade the signal/noise (S/N) ratio during the course of reproduction or the increased distance between the magnetic head and the soft magnetic primary coat 2 should induce degradation of the recording property (OW) and the resolving power.

Figure 11:
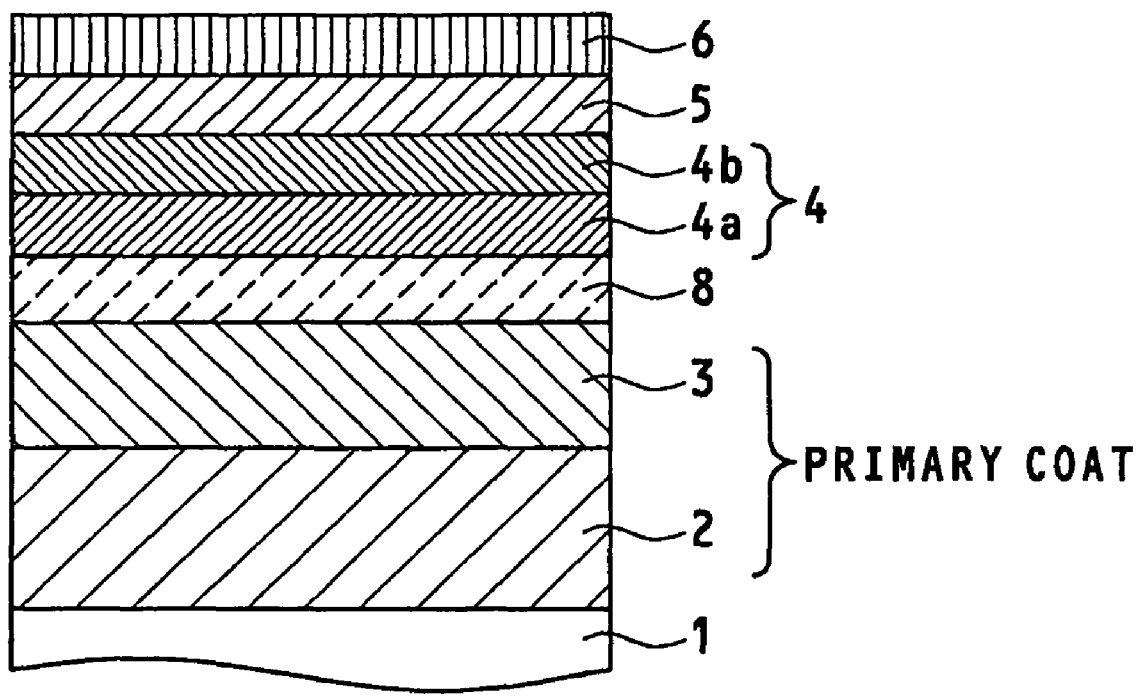
FIG. 11 is a cross section illustrating the construction of still another example of the magnetic recording medium contemplated by this invention.

In another mode of embodying this invention, an intermediate layer 8 may be interposed between the orientation-controlling layer 3 and the perpendicularly magnetic layer 4 as illustrated in FIG. 11 with the object of enhancing the crystallinity and the orientation of the perpendicularly magnetic layer 4.

The intermediate layer 8 is preferably formed of a material that possesses an hcp structure. It is advantageous to use a CoCr alloy or a CrX1 alloy (wherein X1 denotes one or more elements selected from the group consisting of Pt, Ta, Zr, Re, Ru, Cu, Nb, Ni, Mn, Ge, Si, O, N, W, Mo, Ti, V, Zr and B) for the intermediate layer 8.

The Co content of the intermediate layer 8 is preferred to fall in the range of 30 to 70 at %. The reason for specifying this range is that the intermediate layer 8 retains a nonmagnetic property when the Co content is in this range.

The intermediate layer 8 may be formed in a structure having the metal grains of the alloy mentioned above dispersed in the oxide, metal nitride or metal carbide. More advantageously the metal grains possess a columnar structure vertically piercing the intermediate layer 8. By assuming this structure, the intermediate layer 8 is enabled to use an alloy material containing an oxide. $SiO_2$, $Al_2O_3$, $Ta_2O_5$, $Cr_2O_3$, MgO, $Y_2O_3$ and $TiO_2$ are usable as oxides, AlN, $Si_3N_4$, TaN and CrN as metal nitrides, and TaC, BC and SiC as metal carbides. As concrete examples of the alloy, CoCr—$SiO_2$, CoCrPt—$Ta_2O_5$, CoCrRu—$SiO_2$, CoCrRu—$Si_3N_4$ and CoCrPt—TaC may be cited.

The content of the oxide, metal nitride or metal carbide in the intermediate layer 8 is preferred to be 4 mol % or more and 12 mol % or less based on the amount of the alloy. If the content of the oxide, metal nitride or metal carbide in the intermediate layer 8 exceeds the upper limit of the range mentioned above, the excess will be at a disadvantage in suffering the metal grains to retain the oxide, metal nitride or metal carbide as a residue, impairing the crystallinity and the orientation of the metal grains, inevitably inducing precipitation of the oxide, metal nitride or metal carbide above and below the metal grains, allowing the metal grains to form a columnar structure vertically piercing the intermediate layer 8 only with difficulty and possibly impairing the crystallinity and the orientation of the magnetic layer formed on the intermediate layer 8. If the content of the oxide, metal nitride or metal carbide in the intermediate layer 8 falls short of the lower limit of the range mentioned above, the shortage will be at a disadvantage in preventing the addition of the oxide, metal nitride or metal carbide from manifesting the effect thereof.

The thickness of the intermediate layer 8 is preferred to be 20 nm or less (more preferably 10 nm or less) lest the enlarged magnetic grains in the perpendicularly magnetic layer 4 should degrade the signal/noise (S/N) ratio during the course of reproduction or the increased distance between the magnetic head and the soft magnetic primary coat 2 should induce degradation of the recording property (OW) and the resolving power.

Now, one example of the method for producing a magnetic recording medium of the aforementioned construction (the mode of FIG. 1) will be described below.

To produce the magnetic recording medium of the construction mentioned above, a soft magnetic primary coat 2, an orientation-controlling layer 3 and a perpendicularly magnetic layer 4 are sequentially formed respectively by the sputtering technique, vacuum evaporation technique or ion-plating technique on a nonmagnetic substrate 1. Subsequently, a protective layer 5 is formed preferably by the plasma CVD technique, ion beam technique or sputtering technique.

The formation of the perpendicularly magnetic layer 4 may be implemented by forming an oxide-containing magnetic layer 4a, then subjecting the formed layer to a heat treatment and subsequently forming a magnetic layer 4b containing no oxide. The perpendicularly magnetic layer 4 consequently formed may be subjected to an annealing treatment with the object of enhancing the crystallinity of the magnetic grains.

As the nonmagnetic substrate 1, a metal substrate is formed of a metallic material, such as aluminum or an aluminum alloy. A nonmetallic substrate formed of a nonmetallic material, such as glass, ceramic, silicon, silicon carbide or carbon, may be used instead.

The glass substrate is known in various kinds including amorphous glass and glass ceramics, for example. As the amorphous glass, general-purpose soda lime glass and aluminosilicate glass are usable. As the glass ceramics, lithium-based glass ceramics are usable. As the ceramic substrate, sinters have general-purpose aluminum oxide, aluminum nitride and silicon nitride as main components and fiber-reinforced products of such sinters are usable.

As the nonmagnetic substrate 1, the products obtained by forming a NiP layer on the surfaces of the metallic substrate and nonmetallic substrate mentioned above by the plating technique or the sputtering technique are usable.

The nonmagnetic substrate has an average surface roughness, Ra, of 2 nm (20 Å) or less. This is a favorable restriction in fitting the high-density recording with only a low floatation of the head.

Further, the micro-swell (Wa) of the surface is 0.3 nm or less (preferably 0.25 nm or less). This is a favorable restriction in fitting the high-density recording with only a low floatation of the head. At least one of the chamfered part and the lateral surface part of the end face has an average surface roughness, Ra, of 10 nm or less (preferably 9.5 nm or less). The adherence to this restriction is favorable for the sake of flight stability of the magnetic head. The micro-swell (Wa) can be determined, for example, as an average surface roughness accurately within 80 µm by using a surface roughness-testing device (made by KLM-Tencor Corp., U.S.A. and sold under the product code of "P-12").

The nonmagnetic substrate 1, when necessary, is washed and the washed nonmagnetic substrate 1 is disposed inside the chamber of a film-forming device.

On the nonmagnetic substrate 1, the soft magnetic primary coat 2, the orientation-controlling layer and the perpendicularly magnetic layer 4 are formed by the DC or RF magnetron sputtering technique using sputtering targets formed of materials identical in composition with the materials of the relevant layers. The following conditions are adopted for the sputtering required for forming the relevant films. The chamber to be used for the film formation is evacuated till the degree of vacuum reaches a level in the range of $10^{-4}$ to $10^{-7}$ Pa. The chamber admits the nonmagnetic substrate and then introduces an Ar gas, for example, as a sputtering gas and effects electric discharge to induce formation of a film by sputtering. The power supplied in this case is set at a level in the range of 0.1 to 2 kW. By adjusting the duration of the electric discharge and the magnitude of the power supplied, it is made possible to obtain the film in an expected thickness.

It is preferred that the soft magnetic primary coat 2 is formed in a thickness in the range of 50 to 400 nm by adjusting the duration of the electric discharge and the magnitude of the power.

In the formation of the soft magnetic primary coat 2, the use of a sputtering target made of a soft magnetic material is favorable in facilitating the formation of the soft magnetic primary coat. As concrete examples of the soft magnetic material, FeCo-based alloys (such as FeCo and FeCoV), FeNi-based alloys (such as FeNi, FeNiMo, FeNiCr and FeNiSi), FeAl-based alloys (such as FeAl, FeAlSi, FeAlSiCr, FeAlSiTiRu and FeAlO), FeCr-based alloys (such as FeCr, FeCrTi and FeCrCu), FeTa-based alloys (such as FeTa, FeTaC and FeTaN), FeMg-based alloys (such as FeMgO), FeZr-based alloys (such as FeZrN), FeC-based alloys, FeN-based alloys, FeSi-based alloys, FeP-based alloys, FeNb-based alloys, FeHf-based alloys, FeB-based alloys, and FeAlO, FeMgO, FeTaN and FeZrN which contain 60 at % or more of Fe may be cited. Further, CoZr-, CoZrNb-, CoZrTa-, CoZrCr- and CoZrMo-based alloys which contain 80 at % or more of Co, contains at least one element selected from among Zr, Nb, Ta, Cr and Mo and possessing an amorphous structure may be cited as concrete examples of particularly preferred alloys.

The target mentioned above is an alloy target or a sintered alloy target produced by the fusing technique.

After the soft magnetic primary coat 2 has been formed, the orientation-controlling layer is formed in a thickness in the range of 0.5 to 40 nm (preferably 1 to 20 nm) by adjusting the duration of the electric discharge and the magnitude of the power supplied. As concrete examples of the material for the sputtering target to be used in the formation of the orientation-controlling layer 3, Ru-based alloys, Ni-based alloys and Co-based alloys may be cited.

Next, the perpendicularly magnetic layer 4 is formed.

First, the oxide-containing magnetic layer 4a is formed similarly by the sputtering technique using a sputtering target. As concrete examples of the sputtering target to be used herein, (Co14Cr18Pt)90-(SiO$_2$)10 {90 mol % of a metal composition comprising 14 at % of Cr content, 18 at % of Pt content and the balance of Co and 10 mol % of an oxide composition consisting of SiO$_2$}, (Co10Cr16Pt)92-(SiO$_2$)8 {92 mol % of a metal composition comprising 10 at % of Cr content, 16 at % of Pt content and the balance of Co and 8 mol % of an oxide composition consisting of SiO$_2$}, (Co8Cr14Pt4Nb)94-(Cr$_2$O$_3$)6 {94 mol % of a metal composition comprising 8 at % of Cr content, 14 at % of Pt content, 4 at % of Nb content and the balance of Co and 6 mol % of an oxide composition consisting of Cr$_2$O$_3$} and (CoCrPt)—(Ta$_3$O$_5$), (CoCrPtMo)—(TiO), (CoCrPtW)—(TiO$_2$), (CoCrPtB)—(Al$_2$O$_3$), (CoCrPtTaNd)—(MgO), (CoCrPtBCu)—(Y$_2$O$_3$) and (CoCrPtRe)—(SiO$_2$) may be cited.

The content of the oxide is preferred to be 3 mol % or more and 12 mol % or less based on the total amount of Co, Cr and Pt. More preferably, this content is 5 mol % or more and 10 mol % or less.

The reason for specifying the aforementioned range for the content of the oxide in the magnetic layer 4a is that the particular content permits the oxide to be precipitated around the magnetic grains and the isolation and fine division of the magnetic grains to be attained during the formation of the relevant layer. If the content of the oxide exceeds the upper limit of the range mentioned above, the excess will be at a disadvantage in suffering the oxide to survive as a residue in the magnetic grains, impairing the orientation and the crystallinity of the magnetic grains, inducing the precipitation of an oxide 41 above and below magnetic grains 42 as illustrated in FIG. 3 and consequently preventing the magnetic grains 42 from forming a columnar structure vertically piercing the magnetic layer 4a (the structure of FIG. 2). If the content of the oxide falls short of the lower limit of the range mentioned above, the shortage will be at a disadvantage in preventing the magnetic grains from satisfactory separation and fine division, consequently exalting the noise during the course of recording and reproducing operation and disabling the acquisition of the signal/noise (S/N) ratio suitable for high-density recording.

The magnetic layer 4a is preferred to have magnetic grains 42 dispersed in the layer as illustrated in FIG. 2. Further, the magnetic grains 42 are preferred to form a columnar structure (the structure of FIG. 2) vertically piercing the magnetic layer 4a. The formation of this structure necessitates the following conditions besides the use of such a target material as described above.

The sputtering film formation is carried out by using a target made of a material having Co as a main component, containing at least Cr as well and containing an oxide, preparing the chamber for the film formation in a state evacuated till the degree of vacuum reaches a level in the range of $10^{-4}$ to $10^{-7}$ Pa and introducing an Ar gas as the sputtering gas into the chamber and operating the chamber so as to form a film by sputtering. The power to be supplied in this case is set at a level in the range of 0.1 kW to 1 kW. The film of an expected thickness is obtained by adjusting the duration of the electric discharge and the magnitude of the power to be supplied.

In this case, the pressure of the sputtering gas is preferred to be 3 Pa or more and 20 Pa or less. Preferably, the power of electric discharge is set at the lowest possible level and the duration of film formation is elongated to the fullest extent allowed in terms of process. The reason for adopting these conditions is that they enable the magnetic grains to be dispersed in the oxide and allow the magnetic grains to form easily the columnar structure vertically piercing the magnetic layer 4a.

Argon is used as the sputtering gas in the formation of the oxide-containing magnetic layer 4a. Optionally, this sputtering gas may incorporate therein nitrogen gas or oxygen gas, or both.

The addition of nitrogen or oxygen, or both, may be accomplished by using a mixed gas that comprises argon and the additive gases or by separately introducing the component gases of the mixed gas into the chamber and mixing them in the chamber.

The amount of nitrogen or oxygen, or both, to be added is preferred to be 20 vol % or less (preferably 10 vol % or less) based on the volume of argon. If the amount of nitrogen or oxygen to be added exceeds the limit mentioned above, the excess will be at a disadvantage in impairing the crystallinity and the orientation of the magnetic grains and, as a result, possibly degrading the read/write property.

As regards the conditions to be adopted when the material of (Co14Cr18Pt)90-(SiO$_2$)10 {90 mol % of a metal composition comprising 14 at % of Cr content, 18 at % of Pt content and the balance of Co and 10 mol % of an oxide composition consisting of SiO$_2$} is used for the magnetic layer 4a, the power of sputtering electric discharge is preferred to be 0.4 kW, the pressure to be in the range of 6 to 8 Pa, and the amount of oxygen to be added to be in the range of 1 to 2 vol %.

During the formation of the magnetic layer 4a, a negative voltage (substrate bias) may be applied to the nonmagnetic substrate 1. By this application of the negative voltage, it is made possible to promote separation of the magnetic grains and the oxide, induce fine division and isolation of the magnetic grains to a greater extent and permit the acquisition of a read/write property more suitable for high-density recording.

It is preferred that the substrate bias is applied in the range of −100 V to −600 V. If the bias exceeds the upper limit of the range mentioned above, the excess will be at a disadvantage in possibly impairing the crystallinity and the orientation of the magnetic grains. If the bias falls short of the lower limit of the range mentioned above, the shortage is at a disadvantage in preventing the use of the bias from manifesting the effect aimed at.

Next, the magnetic layer 4b containing no oxide is formed similarly by the sputtering technique using a sputtering target. As concrete examples of the material suitable for the magnetic layer 4b, Co16-28Cr {16 to 28 at % of Cr content and the balance of Co} as the CoCr system, Co14-30Cr1-4Ta {14 to 30 at % of Cr content, 1 to 4 at % of Ta content and the balance of Co} as the CoCrTa system, Co14-26Cr1-5Ta1-4B {14 to 26 at % of Cr content, 1 to 5 at % of Ta content, 1 to 4 at % of B content and the balance of Co} as the CoCrTaB system, Co14-30Cr1-5B1-4Nd {14 to 30 at % of Cr content, 1 to 5 at % of B content, 1 to 4 at % of Nd content and the balance of Co} as the CoCrBNd system, Co16-24Cr10-18Pt1-6B {16 to 24 at % of Cr content, 10 to 18 at % of Pt content, 1 to 6 at % of B content and the balance of Co} as the CoCrPtB system, Co16-24Cr1-20Pt1-7Cu {16 to 24 at % of Cr content, 10 to 20 at % of Pt content, 1 to 7 at % of Cu content and the balance of Co} as the CoCrPtCu system, Co16-26Cr10-20Pt1-4Ta1-4Nd {16 to 26 at % of Cr content, 10 to 20 at % of Pt content, 1 to 4 at % of Ta content, 1 to 4 at % of Nd content and the balance of Co} as the CoCrPtTaNd system, Co16-26Cr8-18Pt1-6Nb (16 to 26 at % of Cr content, 8 to 18 at % of Pt content, 1 to 6 at % of Nb content and the balance of Co) as the CoCrPtNb system, and CoCrPtBNd, CoCrPtBW, CoCrPtMo, CoCrPtCuRu and CoCrPtRe may be cited.

The following conditions, for example, are adopted for the formation of the magnetic layer 4b.

The sputtering film formation is carried out by using a target made of a material having Co as a main component, containing at least Cr as well and containing no oxide, preparing the chamber for the film formation in a state evacuated till the degree of vacuum reaches a level in the range of $10^{-4}$ to $10^{-7}$ Pa, introducing an Ar gas as the sputtering gas into the chamber and operating the chamber so as to form a film by sputtering. The power to be supplied in this case is set at a level in the range of 0.1 kW to 2 kW. The film of an expected thickness is obtained by adjusting the duration of the electric discharge and the magnitude of the power to be supplied.

In this case, the pressure of the sputtering gas is preferred to be 20 Pa or less.

In the formation of the magnetic layer 4b containing no oxide, argon is used as the sputtering gas. Optionally, this sputtering gas may incorporate therein nitrogen gas or oxygen gas, or both.

The addition of nitrogen or oxygen, or both, may be accomplished by using a mixed gas that comprises argon and the additive gas or by separately introducing the component gases of this mixed gas into the chamber and mixing them in the chamber.

The amount of nitrogen or oxygen or both to be added is preferred to be 20 vol % or less (preferably 10 vol % or less) based on the volume of argon. If the amount of nitrogen or oxygen to be added exceeds the limit mentioned above, the excess will be at a disadvantage in impairing the crystallinity and the orientation of the magnetic grains and, as a result, possibly degrading the read/write property.

The formation of the magnetic layer 4b may be preceded by application of heat. This application of heat is carried out in vacuum.

Though the temperature of the heat application does not need to be particularly restricted, it is preferred to fall in a range in which the heat applied does not change the shape of the nonmagnetic layer 1. When amorphous glass is adopted, for example, the temperature is preferred to be 300° C. or less.

By forming the magnetic layer 4b in a heated state, it is made possible to induce segregation of Cr in the magnetic layer 4b, promote fine division and isolation of the magnetic grains to a further extent and consequently enhance the read/write property. Since the adoption of the heated state is so favorable, it may be executed as occasion demands.

As regards the conditions to be adopted when the material of Co16Cr12Pt4B {16 at % of Cr content, 12 at % of Pt content, 4 at % of B content and the balance of Co} is used for the magnetic layer 4b, the heating temperature is preferred to fall in the approximate range of 180° C. to 220° C., the power of sputtering electric charge to be 1 kW or less and the pressure to be in the range of 2 to 5 Pa, and no gas is added.

During the formation of the magnetic layer 4b, a negative voltage (substrate bias) may be applied to the nonmagnetic substrate 1. By this application of the negative voltage, it is made possible to induce fine division and isolation of the magnetic grains and permit the acquisition of a read/write property more suitable for high-density recording.

It is preferred that the substrate bias is applied in the range of −100 V to −600 V. If the bias exceeds the upper limit of the range mentioned above, the excess will be at a disadvantage in possibly impairing the crystallinity and the orientation of the magnetic grains. If the bias falls short of the lower limit of the range mentioned above, the shortage would be at a disadvantage in preventing the use of the bias from manifesting the effect aimed at.

After the perpendicularly magnetic layer 4 has been formed, the protective layer 5, such as the protective layer 5 having carbon as a main component, is formed through the sputtering technique or the plasma CVD technique or the combination of these techniques.

Further, the protective layer, when necessary, may be coated with a fluorine-based lubricating agent, such as perfluoropolyether, by the dipping technique or the spin coating technique so as to give rise to a lubricating layer 6.

The magnetic recording medium produced by this invention is provided on a nonmagnetic substrate 1 with at least an orientation-controlling layer 3 for controlling the orientation of a layer formed directly thereon, a perpendicularly magnetic layer 4 having an easily magnetizing axis oriented mainly perpendicularly relative to the nonmagnetic substrate 1, and a protective layer 5 and characterized by the perpendicularly magnetic layer comprising two or more magnetic layers, at least one of the magnetic layers being a layer 4a having Co as a main component and containing Pt as well and containing an oxide and at least another of the magnetic layers being a layer 4b having Co as a main component and containing Cr as well and containing no oxide. Owing to this configuration, it is made possible to promote fine division and magnetic isolation of the magnetic grains, enhance the signal/noise (S/N) ratio greatly during the course of reproduction, also exalt the nucleation (−Hn) and consequently heighten the property of thermal fluctuation, and obtain a medium possessing an outstanding recording property (OW).

Figure 12:
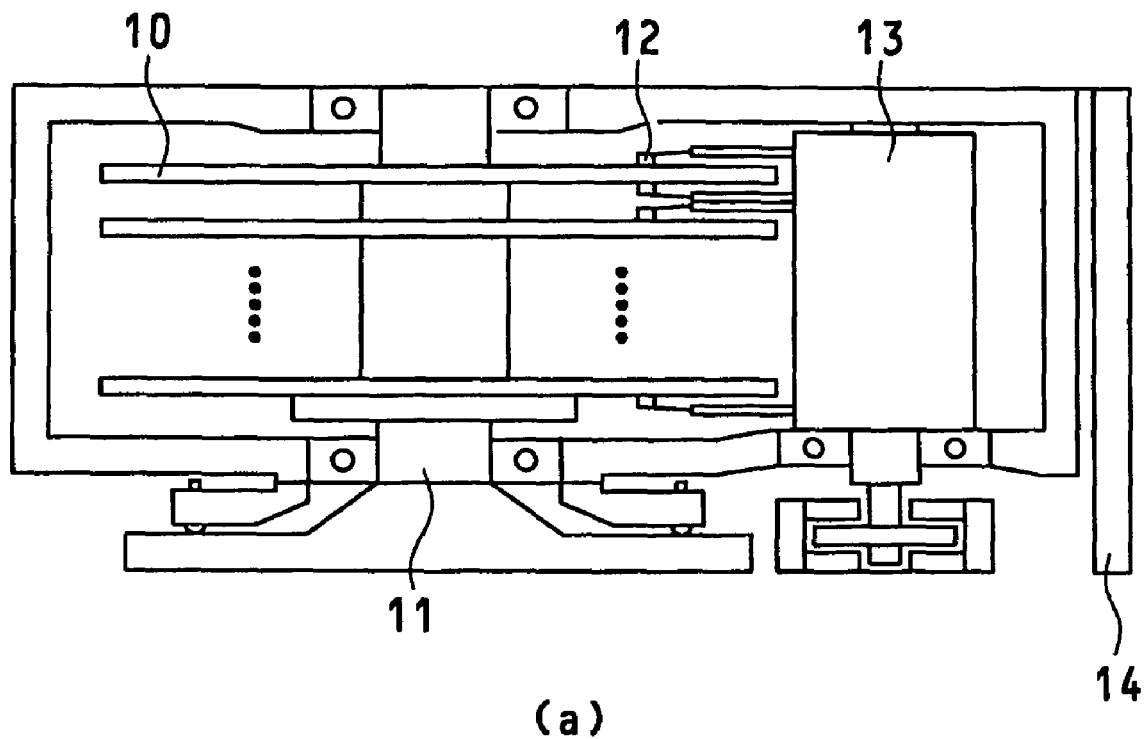
FIG. 12 is a schematic diagram illustrating one example of the magnetic recording and reproducing apparatus contemplated by this invention, FIG. 12(a) depicting the whole construction and FIG. 12(b) depicting the magnetic head.
Figure 12:
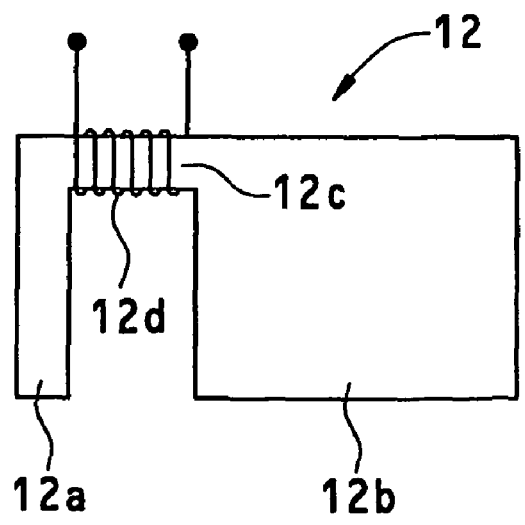

FIG. 12 is a schematic diagram illustrating one example of the magnetic recording and reproducing apparatus contemplated by this invention; FIG. 12(a) depicting the whole construction and FIG. 12(b) the magnetic head. The magnetic recording and reproducing apparatus illustrated here is furnished with a magnetic recording medium 10 possessing the construction shown in FIG. 1, a medium-driving part 11 for rotationally driving the magnetic recording medium 10, a magnetic head 12 for recording and reproducing information in the magnetic recording medium 10, a head-driving part 13 for moving the magnetic head 12 relative to the magnetic recording medium 10, and a recording and reproducing signal-processing system 14. The recording and reproducing signal-processing system 14 is adapted to process data received from the exterior, send the recording signal to the magnetic head 12, process the reproducing signal from the magnetic head 12, and send the processed data to the exterior. As the magnetic head 12 to be used in the magnetic recording and reproducing apparatus of this invention, a head that is provided as the reproducing element with a GMR element utilizing the giant magnetic resistance (GMR) effect and adapted for higher recording density can be utilized.

According to the magnetic recording and reproducing apparatus mentioned above, since the magnetic recording medium of this invention is used for the magnetic recording medium 10, it is made possible to promote fine division and magnetic isolation of the magnetic grains, enhance greatly the signal/noise (S/N) ratio during the course of reproduction, enhance the nucleation (−Hn) and consequently exalt the property of thermal fluctuation, further permit the acquisition of a medium endowed with an outstanding recording property (OW), and complete an excellent magnetic recording and reproducing apparatus suitable for high-density recording.

EXAMPLE 1

A film-forming chamber of a DC magnetron sputtering device (made by ANELVA Corp., JAPAN and sold under the product code of "C-3010") admitted a washed glass substrate (2.5 inches in outer length, product of Ohara K. K., JAPAN), and was evacuated till the degree of vacuum reached $1 \times 10^{-5}$ Pa and then operated to effect sputtering by using a target of Co4Zr7Nb {4 at % of Zr content, 7 at % of Nb content and the balance of Co} at a substrate temperature of 100° C. or less to form a soft magnetic primary coat 2 of a thickness of 100 nm on the glass substrate. By a test with a vibration system magnetic property testing device (VSM), the product, Bs·t (T·nm) of the saturated magnetic flux density Bs (T) multiplied by the film thickness t (nm) of this film was confirmed to be 120 (T·nm).

On the soft magnetic primary coat 2 mentioned above, a Ni40Ta {40 at % of Ta content and the balance of Ni} target and a Ru target were sequentially deposited in a thickness of 5 nm and 20 nm, respectively, to give rise to an orientation-controlling layer 3.

On the orientation-controlling layer, a target formed of (Co14Cr18Pt)90-(SiO$_2$)10 {90 mol % of an alloy composition comprising 14 at % of Cr content, 18 at % of Pt content and the balance of Co and 10 mol % of an oxide consisting of SiO$_2$} was deposited by sputtering under a pressure of 0.7 Pa to form a magnetic layer 4a in a thickness of 10 nm.

Next, a target formed of Co16Cr12Pt4B {16 at % of Cr content, 12 at % of Pt content, 4 at % of B content and the balance of Co} was deposited by sputtering under a pressure of 3 Pa to form a magnetic layer 4b in a thickness of 10 nm.

Subsequently, a protective layer 5 was formed in a thickness of 5 nm by the CVD technique. Then, a lubricating layer 6 formed of perfluoropolyether was formed by the dipping technique to obtain a magnetic recording medium.

The magnetic recording medium consequently obtained was rated for magnetic properties by the use of a Kerr effect-testing device and tested for coercive force (Hc) and nucleation (−Hn).

The read/write property was determined by the use of a read-write analyzer RWA1632 and a spin stand S1701MP made by GUZIK Corp of U.S.A. The head used herein was furnished with a writing single magnetic pole and a GMR element that was intended to function in the reproducing unit.

The signal/noise (S/N) ratio was tested at a recording density of 700 kFCI.

The recording property (OW) was determined by first writing a signal of 700 kFCI, then superposing a signal of 116 kFCI, extracting a high frequency component with a frequency filter and rating the data-writing ability based on the ratio of residue.

The property of thermal fluctuation was determined by performing a writing at a recording density of 50 kFCI under the condition of 70° C. and then computing the attenuation ratio of the output relative to the reproducing output one second after the writing on the basis of (So−S)×100/(So×3). In this formula, the So denotes the reproduction output after the elapse of one second after the writing and S denotes the reproducing output after the elapse of 1000 seconds. The results are shown in the column of Example 1 in Table 1.

TABLE 1

| | | Magnetic layer 4 | | | | | |
|---|---|---|---|---|---|---|---|
| | | Magnetic layer 4a | | | Magnetic layer 4b | | |
| | Composition {(at %)mol %} | | Thickness | Film-forming pressure | Composition (at %) | Thickness | Film-forming pressure |
| Ex. 1 | {(Co14Cr18Pt)90—(SiO$_2$)10} | | 10 (nm) | 0.7 (Pa) | (Co16Cr12Pt4B) | 10 (nm) | 3 (Pa) |
| Ex. 2 | Same as above | | 10 | 2 | Same as above | 10 | 3 |
| Ex. 3 | Same as above | | 10 | 4 | Same as above | 10 | 3 |
| Ex. 4 | Same as above | | 10 | 6 | Same as above | 10 | 3 |
| Ex. 5 | Same as above | | 10 | 8 | Same as above | 10 | 3 |
| Ex. 6 | Same as above | | 10 | 11 | Same as above | 10 | 3 |
| Ex. 7 | Same as above | | 10 | 8 | Same as above | 10 | 0.6 |
| Ex. 8 | Same as above | | 10 | 8 | Same as above | 10 | 5 |
| Ex. 9 | {(Co14Cr18Pt)98—(SiO$_2$)2} | | 10 | 8 | Same as above | 10 | 3 |
| Ex. 10 | {(Co14Cr18Pt)97—(SiO$_2$)3} | | 10 | 8 | Same as above | 10 | 3 |
| Ex. 11 | {(Co14Cr18Pt)93—(SiO$_2$)7} | | 10 | 8 | Same as above | 10 | 3 |
| Ex. 12 | {(Co14Cr18Pt)88—(SiO$_2$)12} | | 10 | 8 | Same as above | 10 | 3 |

TABLE 1-continued

| | | | | | | |
|---|---|---|---|---|---|---|
| Ex. 13 | {(Co14Cr18Pt)85—(SiO$_2$)15} | 10 | 8 | Same as above | 10 | 3 |
| Ex. 14 | {(Co4Cr18Pt)90—(SiO$_2$)10} | 10 | 8 | Same as above | 10 | 3 |
| Ex. 15 | {(Co6Cr18Pt)90—(SiO$_2$)10} | 10 | 8 | Same as above | 10 | 3 |
| Ex. 16 | {(Co16Cr18Pt)90—(SiO$_2$)10} | 10 | 8 | Same as above | 10 | 3 |
| Ex. 17 | {(Co20Cr18Pt)90—(SiO$_2$)10} | 10 | 8 | Same as above | 10 | 3 |
| Ex. 18 | {(Co14Cr8Pt)90—(SiO$_2$)10} | 10 | 8 | Same as above | 10 | 3 |
| Ex. 19 | {(Co14Cr10Pt)90—(SiO$_2$)10} | 10 | 8 | Same as above | 10 | 3 |
| Ex. 20 | {(Co14Cr22Pt)90—(SiO$_2$)10} | 10 | 8 | Same as above | 10 | 3 |
| Comp. Ex. 1 | {(Co14Cr18Pt)90—(SiO$_2$)10} | 10 | 8 | — | — | — |
| Comp. Ex. 2 | Same as above | 20 | 8 | — | — | — |
| Comp. Ex. 3 | (Co14Cr18Pt) | 10 | 0.7 | (Co16Cr12Pt4B) | 10 | 3 |
| Comp. Ex. 4 | — | — | — | Same as above | 10 | 3 |
| Comp. Ex. 5 | — | — | — | Same as above | 20 | 3 |
| Comp. Ex. 6 | {(Co14Cr18Pt)90—(SiO$_2$)10} | 10 | 8 | (Co14Pt) | 10 | 0.7 |
| Comp. Ex. 7 | Same as above | 10 | 8 | (Co12Cr) | 10 | 0.7 |
| Comp. Ex. 8 | Same as above | 10 | 8 | (Fe50Pt) | 10 | 0.7 |
| Comp. Ex. 9 | Same as above | 10 | 8 | {Co(0.2 nm)/Pd(0.5 nm)}10 | 7 | 3 |
| Comp. Ex. 10 | Same as above | | 8 | {Co(0.2 nm)/Pd(0.5 nm)}20 | 14 | 3 |

| | Magnetic properties | | | | |
|---|---|---|---|---|---|
| | Static magnetic property | | Read/write Property | | Property of thermal fluctuation |
| | Coercive force | −Hn | Ow | S/N | (% decade) |
| Ex. 1 | 3400 (Oe) | 1800 (Oe) | 48.5 (dB) | 19.8 (dB) | 0.10 |
| Ex. 2 | 3500 | 1800 | 48.0 | 20.3 | 0.09 |
| Ex. 3 | 3700 | 1850 | 46.5 | 20.8 | 0.09 |
| Ex. 4 | 3800 | 1850 | 46.0 | 21.4 | 0.09 |
| Ex. 5 | 4100 | 1900 | 46.0 | 22.0 | 0.08 |
| Ex. 6 | 3900 | 1750 | 48.5 | 21.1 | 0.09 |
| Ex. 7 | 4000 | 1750 | 47.0 | 21.3 | 0.09 |
| Ex. 8 | 3950 | 1800 | 45.5 | 21.5 | 0.09 |
| Ex. 9 | 3300 | 1000 | 52.0 | 16.5 | 0.24 |
| Ex. 10 | 3400 | 1350 | 54.5 | 17.8 | 0.13 |
| Ex. 11 | 3850 | 1550 | 52.0 | 19.1 | 0.11 |
| Ex. 12 | 3750 | 1600 | 53.5 | 18.8 | 0.11 |
| Ex. 13 | 3600 | 1200 | 52.0 | 17.5 | 0.16 |
| Ex. 14 | 4500 | 2200 | 42.5 | 20.8 | 0.05 |
| Ex. 15 | 4300 | 2100 | 44.0 | 20.9 | 0.06 |
| Ex. 16 | 3500 | 1400 | 53.0 | 20.7 | 0.11 |
| Ex. 17 | 3300 | 1100 | 54.0 | 20.1 | 0.14 |
| Ex. 18 | 3400 | 1000 | 56.0 | 19.6 | 0.19 |
| Ex. 19 | 3600 | 1200 | 54.0 | 19.9 | 0.16 |
| Ex. 20 | 4500 | 1600 | 49.0 | 19.3 | 0.12 |
| Comp. Ex. 1 | 4650 | 800 | 34.5 | 16.5 | 0.45 |
| Comp. Ex. 2 | 5700 | 900 | 21.5 | 12.3 | 0.40 |
| Comp. Ex 3 | 2600 | 700 | 51.0 | 12.2 | 0.47 |
| Comp. Ex. 4 | 2750 | 100 | 57.0 | 13.4 | 0.70 |
| Comp. Ex. 5 | 2800 | 100 | 57.0 | 11.2 | 0.63 |
| Comp. Ex. 6 | 2500 | 300 | 42.5 | 12.9 | 0.45 |
| Comp. Ex. 7 | 2200 | 0 | 43.2 | 11.3 | 0.67 |
| Comp. Ex. 8 | 1800 | −200 | 47.0 | 5.7 | 1.12 |
| Comp. Ex. 9 | 3700 | 900 | 34.0 | 14.6 | 0.38 |
| Comp. Ex. 10 | 4300 | 1000 | 29.0 | 11.2 | 0.33 |

EXAMPLES 2 TO 20

Magnetic recording media were manufactured by following the procedure of Example 1 while changing the magnetic layer 4a and the magnetic layer 4b to the compositions and conditions indicated in the columns of Examples 2 to 20 in Table 1. The results of the rating of these magnetic recording media are shown in Table 1.

COMPARATIVE EXAMPLES 1 TO 7

Magnetic recording media were manufactured by following the procedure of Example 1 while changing the magnetic layer 4a and the magnetic layer 4b to the materials of compositions shown in the columns of Comparative Example 1 to 7 in Table 1 above. The results of the evaluation of these magnetic recording media are shown in Table 1.

COMPARATIVE EXAMPLE 8

A film-forming chamber of a DC magnetron sputtering device (made by ANELVA Corp., JAPAN and sold under the product code of "C-3010") admitted a washed glass substrate (2.5 inches in outer length, product of Ohara K. K., JAPAN), and was evacuated till the degree of vacuum reached $1 \times 10^{-5}$ Pa, and then operated to effect sputtering by using a target of Co4Zr7Nb {4 at % of Zr content, 7 at % of Nb content and the balance of Co} at a substrate temperature of 100° C. or less to form a soft magnetic primary coat 2 of a thickness of 100 nm on the glass substrate. By a test with a vibration system magnetic property testing device (VSM), the product Bs·t (T·nm) of the saturated magnetic flux density Bs (T) multiplied by the film thickness t (nm) of this film was confirmed to be 120 (T·nm).

On the soft magnetic primary coat 2 mentioned above, a Ni40Ta {40 at % of Ta content and the balance of Ni} target and a Ru target were sequentially deposited in a thickness of 5 nm and 20 nm, respectively, to give rise to an orientation-controlling layer 3.

On the orientation-controlling layer 3, a target formed of (Co14Cr18Pt)90-(SiO$_2$)10 {90 mol % of an alloy composition comprising 14 at % of Cr content, 18 at % of Pt content and the balance of Co and 10 mol % of an oxide consisting of SiO$_2$} was deposited by sputtering under a pressure of 8 Pa to form a magnetic layer 4a in a thickness of 10 nm.

Then, as the magnetic layer 4b, layers respectively of targets of Co and Pd were alternately superposed in a Co thickness of 0.2 nm and a Pd thickness of 0.5 nm to form a laminated [Co/Pd] film. The number of layers thus laminated was 10. The sputtering pressure was 3 Pa.

Then, a protective layer 5 of a film thickness of 5 nm was formed by the CVD technique. Subsequently, a lubricating layer 6 of perfluoropolyether was formed by the dipping technique to complete a magnetic recording medium.

COMPARATIVE EXAMPLES 9 AND 10

Magnetic recording media were manufactured by following the procedure of Comparative Example 8 while changing the number of superposed films of the magnetic layer 4b to 20. The results of the rating of the magnetic recording media of Comparative Examples 9 and 10 are shown in Table 1 above.

EXAMPLES 21 TO 39

Magnetic recording media were manufactured by following the procedure of Example 1 while changing the magnetic layer 4a and the magnetic layer 4b to the compositions and the conditions shown in Table 2. The results of the rating of the magnetic recording media of Examples 21 to 39 are shown in Table 2.

TABLE 2

| | Magnetic layer 4 | | | | | |
|---|---|---|---|---|---|---|
| | Magnetic layer 4a | | | Magnetic layer 4b | | |
| | Composition {(at %)mol %} | Thickness | Film-forming pressure | Composition (at %) | Thickness | Film-forming pressure |
| Ex. 21 | {(Co12Cr16Pt)93—(SiO$_2$)7} | 10 (nm) | 8 (Pa) | (Co12Cr16Pt) | 10 (nm) | 3 (Pa) |
| Ex. 22 | Same as above | 10 | 8 | (Co14Cr16Pt) | 10 | 3 |
| Ex. 23 | Same as above | 10 | 8 | (Co19Cr16Pt) | 10 | 3 |
| Ex. 24 | Same as above | 10 | 8 | (Co26Cr16Pt) | 10 | 3 |
| Ex. 25 | Same as above | 10 | 8 | (Co28Cr16Pt) | 10 | 3 |
| Ex. 26 | {(Co10Cr15Pt—2Cu)92—(SiO$_2$)8} | 10 | 8 | (Co19Cr8Pt) | 10 | 3 |
| Ex. 27 | Same as above | 10 | 8 | (Co19Cr10Pt) | 10 | 3 |
| Ex. 28 | Same as above | 10 | 8 | (Co19Cr16Pt) | 10 | 3 |
| Ex. 29 | Same as above | 10 | 8 | (Co19Cr20Pt) | 10 | 3 |
| Ex. 30 | Same as above | 10 | 8 | (Co19Cr24Pt) | 10 | 3 |
| Ex. 31 | {(Co10Cr14Pt—4Mo)92—(SiO$_2$)8} | 10 | 8 | (Co19Cr16Pt) | 10 | 3 |
| Ex. 32 | {(Co10Cr14Pt—4Nb)92—(SiO$_2$)8} | 10 | 8 | Same as above | 10 | 3 |
| Ex. 33 | {(Co10Cr14Pt—3Ta)92—(SiO$_2$)8} | 10 | 8 | (Co19Cr16Pt—2Nd) | 10 | 3 |
| Ex. 34 | {(Co10Cr14Pt4Ta—6W)92—(Cr$_2$O$_3$)8} | 10 | 8 | (Co19Cr16Pt—3B) | 10 | 3 |
| Ex. 35 | {(Co10Cr14Pt4Ta—4W)92—(Cr$_2$O$_3$)8} | 10 | 8 | Same as above | 10 | 3 |
| Ex. 36 | {(Co10Cr14Pt2Ru)94—(Ta$_2$O$_5$)6} | 15 | 6 | (Co16Cr18Pt—4Re2Tb) | 10 | 3 |
| Ex. 37 | {(Co10Cr14Pt)90—(TiO$_2$)10} | 6 | 3 | (Co19Cr16Pt—2B2Cu) | 24 | 0.7 |
| Ex. 38 | {(Co10Cr14Pt)90—(SiO$_2$)4—(Al$_2$O$_3$)6} | 25 | 15 | (Co19Cr16Pt—2Ta2Nd) | 15 | 2 |
| Ex. 39 | {(Co10Cr18Pt5Cu)88—(MgO)8—(Y$_2$O$_3$)4} | 18 | 12 | (Co23Cr16Pt—1Cu—1B) | 12 | 7 |

| | Magnetic properties | | | | |
|---|---|---|---|---|---|
| | Static magnetic property | | Read/write property | | Property of thermal fluctuation |
| | Coercive force | −Hn | Ow | S/N | (% decade) |
| Ex. 21 | 3300 (Oe) | 1800 (Oe) | 51.5 (dB) | 19.3 (dB) | 0.11 |
| Ex. 22 | 3700 | 1800 | 50.0 | 19.7 | 0.11 |
| Ex. 23 | 4000 | 1800 | 49.0 | 20.8 | 0.12 |
| Ex. 24 | 4600 | 1700 | 50.5 | 20.1 | 0.14 |
| Ex. 25 | 4550 | 1100 | 51.0 | 18.5 | 0.19 |
| Ex. 26 | 3400 | 1300 | 53.0 | 18.9 | 0.23 |
| Ex. 27 | 3550 | 1400 | 52.0 | 19.2 | 0.20 |

TABLE 2-continued

| | | | | | |
|---|---|---|---|---|---|
| Ex. 28 | 4150 | 1750 | 48.5 | 21.1 | 0.11 |
| Ex. 29 | 4600 | 1900 | 45.5 | 20.8 | 0.10 |
| Ex. 30 | 4300 | 1750 | 48.0 | 20.1 | 0.10 |
| Ex. 31 | 3950 | 1750 | 49.0 | 20.9 | 0.10 |
| Ex. 32 | 4050 | 1850 | 48.5 | 20.4 | 0.10 |
| Ex. 33 | 4100 | 1900 | 51.0 | 21.6 | 0.08 |
| Ex. 34 | 3500 | 1200 | 54.0 | 19.4 | 0.20 |
| Ex. 35 | 3950 | 1650 | 52.0 | 19.9 | 0.16 |
| Ex. 36 | 3750 | 1600 | 51.0 | 19.1 | 0.17 |
| Ex. 37 | 3950 | 1800 | 49.0 | 19.3 | 0.15 |
| Ex. 38 | 3850 | 1600 | 54.0 | 18.7 | 0.22 |
| Ex. 39 | 4100 | 1650 | 52.0 | 19.3 | 0.16 |

EXAMPLES 40 AND 41

Magnetic recording media were manufactured by following the procedure of Example 1 while changing the construction of the perpendicularly magnetic layer 4 to the sequence of film formation (magnetic layer 4b and magnetic layer 4a). The results of the rating of the magnetic recording media of Examples 40 and 41 are shown in Table 3.

TABLE 3

| | | Example 40 | Example 41 |
|---|---|---|---|
| Magnetic layer 4 | Magnetic layer 4b | | |
| | Composition (at %) | (Co12Cr16Pt) | (Co20Cr12Pt3Sm) |
| | Thickness (nm) | 10 | 6 |
| | Film-forming Pressure (Pa) | 2 | 0.7 |
| | Magnetic layer 4a | | |
| | Composition {(at %) mol %} | {(Co12Cr16Pt)93—(SiO$_2$)7} | {(Co10Cr14Pt)9413 (SiO$_2$)6} |
| | Thickness (nm) | 10 | 16 |
| | Film-forming Pressure (Pa) | 6 | 4 |
| Magnetic properties | Static magnetic property | | |
| | Coercive force (Oe) | 3650 | 3700 |
| | –Hn (Oe) | 1550 | 1650 |
| | Read/write property | | |
| | OW (dB) | 53 | 52.0 |
| | S/N (dB) | 18.5 | 18.6 |
| | Property of thermal fluctuation (% decade) | 0.12 | 0.12 |

EXAMPLES 42 TO 44

Magnetic recording media were manufactured by following the procedure of Example 1 while changing the construction of the perpendicularly magnetic layer 4 to the sequence of film formation (magnetic layer 4a, magnetic layer 4b-1 and magnetic layer 4b-2) shown in Table 4 and changing the compositions thereof to those shown in Table 4. The results of the rating of the magnetic recording media of Examples 42 to 44 are shown in Table 4.

TABLE 4

| | | Example 42 | Example 43 | Example 44 |
|---|---|---|---|---|
| Magnetic layer 4 | Magnetic layer 4a | | | |
| | Composition {(at %) mol %} | {(Co8Cr12Pt)94—(SiO$_2$)6} | {(Co8Cr12Pt)94—(SiO$_2$)6} | {(Co10Cr—16Pt)94—(Cr$_2$O$_3$)6} |
| | Thickness | 14 (nm) | 14 | 12 |
| | Film-forming pressure | 5 | 5 | 9 |

TABLE 4-continued

|  |  | Example 42 | Example 43 | Example 44 |
|---|---|---|---|---|
|  | Magnetic layer 4b-1 |  |  |  |
|  | Composition (at %) | (Co23Cr14Pt) | (Co23Cr14Pt) | (Co16Cr12Pt2B) |
|  | Thickness | 6 (nm) | 6 | 7 |
|  | Film-forming pressure | 0.7 (Pa) | 0.7 | 3 |
|  | Magnetic layer 4b-2 |  |  |  |
|  | Composition (at %) | (Co18Cr12Pt2Nd) | (Co14Cr18Pt2Cu) | (Co22Cr16Pt1W) |
|  | Thickness | 4 (nm) | 6 | 8 |
|  | Film-forming pressure | 3 (Pa) | 2 | 0.7 |
| Magnetic properties | Static magnetic property |  |  |  |
|  | Coercive force (Oe) | 4000 | 4150 | 4200 |
|  | −Hn (Oe) | 1900 | 1750 | 1850 |
|  | Read/write property |  |  |  |
|  | OW (dB) | 49 | 53 | 51 |
|  | S/N (dB) | 20.9 | 21.1 | 21.2 |
|  | Property of thermal fluctuation (% decade) | 0.11 | 0.12 | 0.11 |

EXAMPLES 46 AND 47

Magnetic recording media were manufactured by following the procedure of Example 1 while changing the construction of the perpendicularly magnetic layer 4 to the sequence of film formation (magnetic layer 4b-1, magnetic layer 4a-1, magnetic layer 4b-2, magnetic layer 4a-2 and magnetic layer 4b-3) shown in Table 5 and also changing the compositions to those shown in Table 5. The results of the rating of the magnetic recording media of Examples 46 and 47 are shown in Table 5.

TABLE 5

|  |  | Example 46 | Example 47 |
|---|---|---|---|
| Magnetic layer 4 | Magnetic layer 4b-1 |  |  |
|  | Composition (at %) | (Co20Cr14Pt2B) | (Co20Cr14Pt2B) |
|  | Thickness (nm) | 4 | 4 |
|  | Film-forming pressure (Pa) | 0.7 | 0.7 |
|  | Magnetic layer 4a-1 |  |  |
|  | Composition {(at %) mol %} | {(Co14Cr18Pt)95—(SiO$_2$)5} | {(Co14Cr14Pt)95—(SiO$_2$)5} |
|  | Thickness (nm) | 4 | 4 |
|  | Film-forming pressure (Pa) | 6 | 6 |
|  | Magnetic layer 4b-2 |  |  |
|  | Composition (at %) | (Co20Cr14Pt12B) | (Co14Cr16Pt2Cu) |
|  | Thickness (nm) | 4 | 0.7 |
|  | Film-forming pressure (Pa) | 6 | 2 |
|  | Magnetic layer 4a-2 |  |  |
|  | Composition {(at %) mol %} | {(Co14Cr18Pt)95—(SiO$_2$)5} | {(Co14Cr18Pt)95—(Cr$_2$O$_3$)5} |
|  | Thickness | 4 | 6 |
|  | Film-forming pressure | 6 | 3 |
|  | Magnetic layer 4b-3 |  |  |
|  | Composition (at %) | (Co20Cr14Pt2B) | (Co20Cr14Pt2B) |
|  | Thickness (nm) | 4 | 4 |
|  | Film-forming pressure (Pa) | 0.7 | 0.7 |

TABLE 6

| | Magnetic properties | | | | |
|---|---|---|---|---|---|
| | Static magnetic property | | Read/write property | | Property of thermal fluctuation (% decade) |
| | Coercive force (Oe) | −Hn (Oe) | Ow (dB) | S/N (dB) | |
| Ex. 46 | 3950 | 1550 | 49.0 | 22.5 | 0.11 |
| Ex. 47 | 4150 | 1600 | 49.0 | 22.7 | 0.10 |

EXAMPLE 48

A magnetic recording medium was manufactured by following the procedure of Example 1 while changing the construction of the perpendicularly magnetic layer 4 to the sequence of film formation (magnetic layer 4a, magnetic layer 4b-1, nonmagnetic layer 9, magnetic layer 4b-2) shown in Table 6 and also changing the composition to that of Table 7. The results of the rating of the magnetic recording medium of Example 48 are shown in Table 7.

TABLE 7

| | | Example 48 |
|---|---|---|
| Magnetic layer 4 | Magnetic layer 4a | |
| | Composition {(at %) mol %} | {(Co12Cr17Pt1W)95—(Al$_2$O$_3$)5} |
| | Thickness (nm) | 10 |
| | Film-forming pressure (Pa) | 6 |
| | Magnetic layer 4b-1 | |
| | Composition (at %) | (Co24Cr16Pt) |
| | Thickness (nm) | 5 |
| | Film-forming pressure (Pa) | 3 |
| | Nonmagnetic layer 9 | |
| | Composition (at %) | (Co35Cr) |
| | Thickness (nm) | 2 |
| | Magnetic layer 4b-2 | |
| | Composition (at %) | (Co19Cr12Pt13Re) |
| | Thickness (nm) | 6 |
| | Film-forming pressure (Pa) | 2 |
| Magnetic properties | Static magnetic property | |
| | Coercive force (Oe) | 3850 |
| | −Hn (Oe) | 1700 |
| | Read/wire property | |
| | Ow (dB) | 48 |
| | S/N (dB) | 22.9 |
| | Property of thermal fluctuation (% decade) | 0.13 |

EXAMPLE 49

A magnetic recording medium was manufactured by following the procedure of Example 1 while changing the construction of the perpendicularly magnetic layer 4 to the sequence of film formation (magnetic layer 4a-1, nonmagnetic layer 9, magnetic layer 4a-2 and magnetic layer 4b) shown in Table 8 and also changing the composition to that shown in Table 8. The results of the rating of the magnetic recording medium of Example 49 are shown in Table 8.

TABLE 8

| | | Example 49 |
|---|---|---|
| Magnetic layer 4 | Magnetic layer 4a-1 | |
| | Composition {(at %) mol %} | {(Co10Cr11Pt1W)92—(MgO)8} |
| | Thickness (nm) | 12 |
| | Film-forming pressure (Pa) | 4 |
| | Nonmagnetic layer 9 | |
| | Composition (at %) | Ru |
| | Thickness (nm) | 1 |
| | Magnetic layer 4a-2 | |
| | Composition (at %) | (Co25Cr14Pt4B) |
| | Thickness (nm) | 4 |
| | Film-forming pressure (Pa) | 3 |
| | Magnetic layer 4b | |
| | Composition (at %) | (Co19Cr11Pt3B) |
| | Thickness (nm) | 4 |
| | Film-forming pressure (Pa) | 3 |
| Magnetic properties | Static magnetic property | |
| | Coercive force (Oe) | 3750 |
| | −Hn (Oe) | 1600 |
| | Read/write property | |
| | Ow (dB) | 49 |
| | S/N (dB) | 21.5 |
| | Property of thermal fluctuation (% decade) | 0.11 |

EXAMPLES 50 TO 53

Magnetic recording media were manufactured by following the procedure of Example 1 while changing the construction of the perpendicularly magnetic layer 4 to the sequence of film formation (magnetic layer 4a-1, nonmagnetic layer 9, magnetic layer 4a-2 and magnetic layer 4b) shown in Table 9 and also changing the compositions to those shown in Table 9. The results of the rating of the magnetic recording media of Examples 50 to 53 are shown in Table 9.

TABLE 9

| | | Example 50 | Example 51 |
|---|---|---|---|
| Magnetic layer 4 | Magnetic layer 4a-1 | | |
| | Composition {(at %) mol %} | {(Co12Cr15Pt)90—(Y$_2$O$_3$)10} | {(Co12Cr15Pt)90—(Y$_2$O$_3$)10} |
| | Thickness (nm) | 8 | 8 |
| | Film-forming pressure (Pa) | 5 | 5 |

TABLE 9-continued

|   | | Example 52 | Example 53 |
|---|---|---|---|
| | Nonmagnetic layer 9 | | |
| | Composition {(at %) mol %} | {(Co50CRu)93—(SiO$_2$)7} | {(Co50Ru)93—(TiN)7} |
| | Thickness (nm) | 2 | 1.5 |
| | Magnetic layer 4a-2 | | |
| | Composition {(at %)mol %} | {(Co12Cr11Pt)90—(Y$_2$O$_3$)10} | (Co12Cr11Pt)90—(Y$_2$O$_3$)10) |
| | Thickness (nm) | 8 | 8 |
| | Film-forming pressure (Pa) | 8 | 8 |
| | Magnetic layer 4b | | |
| | Composition (at %) | (Co19Cr11Pt3B) | (Co19Cr11Pt3B) |
| | Thickness (nm) | 4 | 4 |
| | Film-forming pressure (Pa) | 3 | 3 |

|   | | Example 52 | Example 53 |
|---|---|---|---|
| Magnetic | Magnetic layer 4a-1 | | |
| layer 4 | Composition {(at %) mol %} | {(Co12Cr15Pt)90—(Y$_2$O$_3$)10} | {(Co12Cr15Pt)90—(Y$_2$O$_3$)10} |
| | Thickness (nm) | 8 | 8 |
| | Film-forming pressure (Pa) | 5 | 5 |
| | Nonmagnetic layer 9 | | |
| | Composition {(at %) mol %} | {(Co50CRu)93—(SiO$_2$)7} | {(Co50Ru)93—(TiN)7} |
| | Thickness (nm) | 2 | 1.5 |
| | Magnetic layer 4a-2 | | |
| | Composition {(at %)mol %} | {(Co12Cr11Pt)90—(Y$_2$O$_3$)10} | (Co12Cr11Pt)90—(Y$_2$O$_3$)10) |
| | Thickness (nm) | 8 | 8 |
| | Film-forming pressure (Pa) | 8 | 8 |
| | Magnetic layer 4b | | |
| | Composition (at %) | (Co19Cr11Pt3B) | (Co19Cr11Pt3B) |
| | Thickness (nm) | 4 | 4 |
| | Film-forming pressure (Pa) | 3 | 3 |

| | Magnetic properties | | | | |
|---|---|---|---|---|---|
| | Static magnetic property | | Read/write property | | Property of thermal fluctuation |
| | Coercive force (Oe) | −Hn (Oe) | Ow (dB) | S/N (dB) | (% decade) |
| Ex. 50 | 3900 | 1700 | 50 | 21.1 | 0.13 |
| Ex. 51 | 3800 | 1650 | 50 | 21.5 | 0.13 |
| Ex. 52 | 3950 | 1700 | 51 | 20.8 | 0.13 |
| Ex. 53 | 3400 | 1450 | 53 | 19.4 | 0.15 |

EXAMPLE 54

A film-forming chamber of a DC magnetron sputtering device (made by ANELVA Corp., JAPAN and sold under the product code of "C-3010") admitted a washed glass substrate (2.5 inches in outer length, product of Ohara K. K., JAPAN), and was evacuated till the degree of vacuum reached $1 \times 10^{-5}$ Pa, and then operated to effect sputtering by using a target of Co4Zr7Nb {4 at % of Zr content, 7 at % of Nb content and the balance of Co} at a substrate temperature of 100° C. or less to form a soft magnetic primary coat 2 of a thickness of 100 nm on the glass substrate. By a test with a vibration system magnetic property testing device (VSM), the product, Bs·t (T·nm) of the saturated magnetic flux density Bs (T) multiplied by the film thickness t (nm) of this film was confirmed to be 120 (T·nm).

On the soft magnetic primary coat 2, a film was formed in a thickness of 20 nm by using a Ru target to give rise to an orientation-controlling layer.

On the orientation-controlling layer 3, a (Co12Cr20Pt)90-(SiO$_2$)10 {90 mol % of an alloy composition comprising 12 at % of Cr content, 20 at % of Pt content and the balance of Co and 10 mol % of an oxide consisting of SiO$_2$} target was deposited in a thickness of 10 nm under a sputtering pressure of 0.7 Pa to give rise to a magnetic layer 4a.

Then, a target formed of Co20Cr13Pt3B {20 at % of Cr content, 13 at % of Pt content, 3 at % of B content and the balance of Co} was deposited under a sputtering pressure of 3 Pa to give rise to a magnetic layer 4b in a thickness of 10 nm.

Subsequently, a protective layer 5 of a thickness of 5 nm was formed by the CVD technique. Then, a lubricating layer 6 of perfluoropolyether was formed by the dipping technique to complete a magnetic recording medium. The results of the rating of the magnetic recording medium of Example 54 are shown in Table 10.

TABLE 10

| | Orientation-controlling layer 3 | | Intermediate layer 8 | |
|---|---|---|---|---|
| | Composition {(at %)mol %} | Thickness (nm) | Composition {(at %)mol %} | Thickness (nm) |
| Ex. 54 | Ru | 20 | — | — |
| Ex. 55 | Pd | 15 | — | — |
| Ex. 56 | Pt | 15 | — | — |
| Ex. 57 | {(Ru)90—(SiO$_2$)10} | 25 | — | — |
| Ex. 58 | {(Ni40Ta)95—(TiO$_2$)5} | 25 | — | — |
| Ex. 59 | {(Pt)94—(TaC)6} | 30 | — | — |
| Ex. 60 | {(Pt)94—(Si$_3$N$_4$)6} | 20 | — | — |
| Ex. 61 | Ru | 20 | {Co35Cr} | 2 |
| Ex. 62 | Ru | 20 | (C40Cr8pt3Ta) | 3 |
| Ex. 63 | Ru | 20 | {(Co30Cr5Pt)94—(Cr$_2$O$_3$)6} | 5 |
| Ex. 64 | Ru | 20 | {(Co38Cr4Pt6B)92—(AlN)8} | 5 |
| Ex. 65 | Ru | 20 | {(Co38Cr4Pt6B)92—(BC)8} | 5 |
| Ex. 66 | Ru | 20 | {Ca38Cr4Pt4B}92—(Al$_2$O$_3$)8} | 8 |

| | Magnetic properties | | | | |
|---|---|---|---|---|---|
| | Static magnetic property | | Read/write property | | Property of thermal fluctuation |
| | Coercive force (Oe) | −Hn (Oe) | Ow (dB) | S/N (dB) | (% decade) |
| Ex. 54 | 4200 | 1600 | 50 | 20.9 | 0.13 |
| Ex. 55 | 4300 | 1550 | 51 | 20.5 | 0.14 |
| Ex. 56 | 4500 | 1800 | 49 | 21.5 | 0.11 |
| Ex. 57 | 3600 | 1400 | 54 | 20.8 | 0.15 |
| Ex. 58 | 3400 | 1100 | 55 | 19.6 | 0.21 |
| Ex. 59 | 3500 | 1250 | 54 | 20.4 | 0.19 |
| Ex. 60 | 3600 | 1100 | 54 | 19.4 | 0.17 |
| Ex. 61 | 4500 | 1750 | 50 | 21.5 | 0.11 |
| Ex. 62 | 4450 | 1800 | 49 | 21.8 | 0.11 |
| Ex. 63 | 3900 | 1550 | 50 | 21.1 | 0.14 |
| Ex. 64 | 3800 | 1600 | 50 | 20.4 | 0.16 |
| Ex. 65 | 3400 | 1200 | 51 | 19.3 | 0.19 |
| Ex. 66 | 3600 | 1350 | 51 | 19.5 | 0.17 |

EXAMPLES 55 TO 60

Magnetic recording media were manufactured by following the procedure of Example 54 while changing the material of the orientation-controlling layer to the materials shown in Table 10. The results of the rating of the magnetic recording media of Examples 55 to 60 are shown in Table 10.

EXAMPLE 61

A film-forming chamber of a DC magnetron sputter device (made by ANELVA Corp., JAPAN and sold under the product code of "C-3010") admitted a washed glass substrate (2.5 inches in outer length, product of Ohara K. K., JAPAN), and was evacuated till the degree of vacuum reached $1\times10^{-5}$ Pa and then operated to effect sputtering by using a target of Co4Zr7Nb {4 at % of Zr content, 7 at % of Nb content and the balance of Co} at a substrate temperature of 100° C. or less to form a soft magnetic primary coat 2 of a thickness of 100 nm on the glass substrate. By a test with a vibration system magnetic property testing device (VSM), the product Bs·t (T·nm) of the saturated magnetic flux density Bs (T) multiplied by the film thickness t (nm) of this film was confirmed to be 120 (T·nm).

On the soft magnetic primary coat 2 mentioned above, a film was formed in a thickness of 20 nm by using a Ru target to give rise to an orientation-controlling layer 3.

On the orientation-controlling layer 3, a film was formed in a thickness of 2 nm by using a Co35Cr {35 at % of Cr content and the balance of Co} target to give rise to an intermediate layer 8.

On the intermediate layer 8, a magnetic layer 4a was formed in a thickness of 10 nm by using a (Co12Cr20Pt)90-(SiO$_2$)10 {90 mol % of an alloy composition comprising 12 at % of Cr content, 20 at % of Pt content and the balance of Co and 10 mol % of an oxide consisting of SiO$_2$} target under a sputtering pressure of 0.7 Pa.

Subsequently, a magnetic layer 4b was formed in a thickness of 10 nm by using a target formed of Co20Cr13Pt3B {20 at % of Cr content, 13 at % of Pt content, 3 at % of B content and the balance of Co} under a sputtering pressure of 3 Pa.

Subsequently, a protective layer 5 was formed in a thickness of 5 nm by the CVD technique. Then, a lubricating layer 6 of perfluoropolyether was formed by the dipping technique to complete a magnetic recording medium. The results of the rating of the magnetic recording medium of Example 61 are shown in Table 10.

EXAMPLES 62 TO 66

Magnetic recording media were manufactured by following the procedure of Example 61 while changing the material to the materials shown in Table 10. The results of the rating of the magnetic recording media of Example 62 to 66 are shown in Table 10.

EXAMPLES 67 TO 78

Magnetic recording media were manufactured by following the procedure of Example 1 while changing the conditions of the perpendicularly magnetic layer 4, such as the material, added gas and substrate bias, to the conditions shown in Table 11. The results of the rating of the magnetic recording media of Examples 67 to 78 are shown in Table 11.

TABLE 11

| | Magnetic layer 4 / Magnetic layer 4a | | | | |
|---|---|---|---|---|---|
| | Composition {(at %)mol %} | Thickness (nm) | Film-forming pressure (Pa) | Added gas | Substrate bias |
| Ex. 67 | {(Co10Cr16Pt)92—SiO$_2$)8} | 9 | 6 | — | — |
| Ex. 68 | Same as above | 9 | 6 | O$_2$—0.3 vol % | — |
| Ex. 69 | Same as above | 9 | 6 | O$_2$—0.6 vol % | — |
| Ex. 70 | Same as above | 9 | 6 | O$_2$—1.2 vol % | — |
| Ex. 71 | Same as above | 9 | 6 | O$_2$—2 vol % | — |
| Ex. 72 | Same as above | 9 | 6 | O$_2$—4 vol % | — |
| Ex. 73 | Same as above | 9 | 6 | N$_2$—0.5 vol % | — |
| Ex. 74 | Same as above | 9 | 6 | O$_2$—0.6 vol % | — |
| Ex. 75 | Same as above | 9 | 6 | O$_2$—0.6 vol % | −150 V |
| Ex. 76 | Same as above | 9 | 6 | O$_2$—0.6 vol % | −300 V |
| Ex. 77 | Same as above | 9 | 6 | O$_2$—0.6 vol % | −600 V |
| Ex. 78 | Same as above | 9 | 6 | O$_2$—0.6 vol % | — |

| | Magnetic layer 4 / Magnetic layer 4b | | | | |
|---|---|---|---|---|---|
| | Composition (at %) | Thickness (nm) | Film-forming pressure (Pa) | Added gas | Substrate bias |
| Ex. 67 | (Co23Cr16Pt1Cu1B) | 9 | 0.7 | — | — |
| Ex. 68 | Same as above | 9 | 0.7 | — | — |
| Ex. 69 | Same as above | 9 | 0.7 | — | — |
| Ex. 70 | Same as above | 9 | 0.7 | — | — |
| Ex. 71 | Same as above | 9 | 0.7 | — | — |
| Ex. 72 | Same as above | 9 | 0.7 | — | — |
| Ex. 73 | Same as above | 9 | 0.7 | — | — |
| Ex. 74 | Same as above | 9 | 0.7 | O$_2$—0.3 vol % | — |
| Ex. 75 | Same as above | 9 | 0.7 | — | — |
| Ex. 76 | Same as above | 9 | 0.7 | — | — |
| Ex. 77 | Same as above | 9 | 0.7 | — | — |
| Ex. 78 | Same as above | 9 | 0.7 | — | −200 V |

| | Magnetic properties | | | | |
|---|---|---|---|---|---|
| | Static magnetic property | | Read/write property | | Property of thermal fluctuation |
| | Coercive force (Oe) | −Hn (Oe) | Ow (dB) | S/N (dB) | (% decade) |
| Ex. 67 | 4300 | 2000 | 51.5 | 21.5 | 0.09 |
| Ex. 68 | 4450 | 2000 | 50.5 | 21.9 | 0.09 |
| Ex. 69 | 4600 | 2000 | 49 | 22.5 | 0.09 |
| Ex. 70 | 4550 | 2000 | 49 | 22.4 | 0.09 |
| Ex. 71 | 4500 | 1950 | 50 | 22.1 | 0.09 |
| Ex. 72 | 4200 | 1600 | 53 | 19.7 | 0.13 |
| Ex. 73 | 4300 | 1850 | 52 | 21.8 | 0.09 |
| Ex. 74 | 4400 | 1900 | 51.5 | 22.9 | 0.09 |
| Ex. 75 | 4700 | 2050 | 49 | 22.6 | 0.09 |
| Ex. 76 | 4700 | 2000 | 49 | 22.8 | 0.09 |
| Ex. 77 | 4650 | 2000 | 49 | 22.5 | 0.09 |
| Ex. 78 | 4750 | 2000 | 48 | 23.5 | 0.09 |

It is revealed from the comparison of Example 5 with Comparative Examples 1, 2, 4, 5, 6, 8, 9 and 10 in Table 1 that in the formation of the perpendicularly magnetic layer 4 contemplated by this invention, the construction of this perpendicularly magnetic layer 4 with a magnetic film having Co as a main component, containing Pt as well and containing an oxide and a magnetic layer having Co as a main component, containing Cr as well and containing no oxide manifests an effect peculiar thereto. It is noted that Example 5 of this invention enhanced the nucleation (−Hn) to a great extent and manifested the property of thermal fluctuation and the read/write property (S/N ratio and recording property) favorably as compared with Comparative Examples 1 and 2 which formed only oxide-containing magnetic layers.

It is learnt from the comparison of Example 5 with Comparative Examples 6, 7, 8 and 9 that for this invention, the fact that the magnetic layer 4b has Co as a main component and contains at least Cr is important.

It is learnt from the comparison of Example 1 with Comparative Example 3 that the formation of a perpendicularly magnetic layer 4 necessitates a magnetic layer having at least one layer containing an oxide.

It is learnt from the comparison of Examples 5 and 9 to 13 that the content of the oxide in the oxide-containing magnetic layer 4a is preferred to be 3 mol % or more and 12 mol % or less It is learnt from the comparison of Examples 5 and 14 to 17 that the Cr content in the oxide-containing magnetic layer 4a is preferred to be 6 at % or more and 16 at % or less.

It is learnt from the comparison of Examples 5 and 18 to 20 the Pt content in the oxide-containing magnetic layer 4a is preferred to be 10 at % or more and 20 at % or less.

Then in Table 2, it is learnt from the comparison of Examples 21 to 25 that the Cr content in the magnetic layer 4b containing no oxide is preferred to be 14 at % or more and 30 at % or less.

It is learnt from the comparison of Examples 26 to 30 that the Pt content in the magnetic layer 4b containing no oxide is preferred to 8 at % or more and 20 at % or less.

It is learnt from Table 2 that the oxide of the oxide-containing magnetic layer 4a is preferred to be $Cr_2O_3$, $SiO_2$ or $Ta_2O_5$. It is further learnt that it may be a material containing a plurality of oxides.

It is learnt that the material to be used for the perpendicularly magnetic layer 4 may contain at least one element selected from the group consisting of B, Ta, Mo, Cu, Nd, W, Nb, Sm, Tb, Ru and Re besides Co, Cr and Pt.

It is learnt from Table 3 that the construction of the perpendicularly magnetic layer 4 may be such that the magnetic layer 4b containing no oxide and the oxide-containing magnetic layer 4a are sequentially placed in the order mentioned.

It is learnt from Table 4, Table 5 and Table 6 that the perpendicularly magnetic layer 4 may be constructed of three kinds of magnetic layers.

It is learnt from Table 7, Table 8 and Table 9 that the nonmagnetic layer 9 may be formed between any of the adjacent component layers of the perpendicularly magnetic layer 4.

It is further learnt that the perpendicularly magnetic layer 4 may be constructed of a plurality of oxide-containing magnetic layers.

It is learnt from Table 10 that the orientation-controlling layer 3 may use a material containing an oxide, metal nitride and metal carbide besides a metallic material assuming the hcp structure of Ru, Pt or Pd.

It is further learnt that the intermediate layer 8 may be interposed between the orientation-controlling layer 3 and the perpendicularly magnetic layer 4.

It is learnt from Table 11 that the addition of a gas during the formation of the perpendicularly magnetic layer 4 and the substrate bias result in enhancing properties.

INDUSTRIAL APPLICABILITY

The magnetic recording medium of this invention, as described above, is provided on a nonmagnetic substrate with at least an orientation-controlling layer for controlling the orientation of a layer formed directly thereon, a perpendicularly magnetic layer having an easily magnetizing axis oriented mainly perpendicular relative to the nonmagnetic substrate, and a protective layer and characterized in that the perpendicularly magnetic layer comprises two or more magnetic layers, at least one of the magnetic layers being a layer having Co as a main component and containing Pt as well and containing an oxide and at least another of the magnetic layers being a layer having Co as a main component and containing Cr as well and containing no oxide. By this configuration, it is made possible to promote fine division and magnetic isolation of the magnetic grains, enhance the signal/noise (S/N) ratio to a great extent during the course of reproduction, improve the nucleation (-Hn) and consequently exalt the property of thermal fluctuation and acquire a medium possessing a proper recording property (OW).

What is claimed is:

1. A magnetic recording medium comprising:
a nonmagnetic substrate; and
at least three layers formed on the nonmagnetic substrate and comprised of a nonmagnetic orientation-controlling layer for controlling orientation of a layer formed directly thereon, a perpendicular magnetic layer having an easily magnetizing axis oriented mainly perpendicularly relative to the nonmagnetic substrate, and a protective layer;

said perpendicular magnetic layer comprising two or more magnetic layers and at least one nonmagnetic layer, at least one of said magnetic layers being a lower layer having Co as a main component and containing Pt and an oxide and at least another of said magnetic layers being an upper layer having Co as a main component and containing Cr and no oxide;

said lower magnetic layer being directly adjacent to and in contact with the orientation-controlling layer and comprising magnetic crystal grains isolated by an oxide penetrating said lower layer and dispersed in the lower layer, said crystal grains vertically penetrating said lower layer in columnar forms;

said nonmagnetic layer being between said lower magnetic layer and said upper layer and having nonmagnetic grains that possess a columnar structure vertically penetrating said nonmagnetic layer; and said upper layer comprising magnetic crystal grains that are formed and epitaxially grown from surfaces of the magnetic crystal grains of the lower layer in a ratio of one to one.

2. A magnetic recording medium according to claim 1, wherein said oxide is an oxide of at least one nonmagnetic metal selected from among Cr, Si, Ta, Al and Ti.

3. A magnetic recording medium according to claim 1, wherein said oxide is $Cr_2O_3$ or $SiO_2$.

4. A magnetic recording medium according to claim 1, wherein said magnetic layer containing the oxide has an oxide content of 3 mol % or more and 12 mol % or less.

5. A magnetic recording medium according to claim 1, wherein said magnetic layer containing the oxide has Co as a main component and has a Cr content of 0 at % or more and 16 at % or less and a Pt content of 10 at % or more and 25 at % or less.

6. A magnetic recording medium according to claim 1, wherein said magnetic layer containing the oxide contains at least one element selected from the group consisting of B, Ta, Mo, Cu, Nd, W, Nb, Sm, Tb, Ru and Re and has a total content of said at least one element that is 8 at % or less.

7. A magnetic recording medium according to claim 1, wherein said magnetic layer containing no oxide has Co as a main component and has a Cr content of 14 at % or more and 30 at % or less.

8. A magnetic recording medium according to claim 1, wherein the magnetic layer containing no oxide has Co as a main component and has a Cr content of 14 at % or more and 30 at % or less and a Pt content of 8 at % or more and 20 at % or less.

9. A magnetic recording medium according to claim 1, wherein said magnetic layer containing no oxide contains at least one element selected from the group consisting of B, Ta, Mo, Cu, Nd, W, Nb, Sm, Tb, Ru and Re and has a total content of said at least one element that is 8 at % or less.

10. A magnetic recording medium according to claim 1, wherein said perpendicularly magnetic layer contains two or more oxide-containing layers.

11. A magnetic recording medium according to claim 1, wherein said perpendicularly magnetic layer contains two or more layers containing no oxide.

12. A magnetic recording and reproducing apparatus furnished with a magnetic recording medium and a magnetic head for recording and reproducing information in said magnetic recording medium, said apparatus being characterized in that said magnetic recording medium is the magnetic recording medium set forth in claim 1.

* * * * *